United States Patent
Konno

(10) Patent No.: US 9,275,280 B2
(45) Date of Patent: Mar. 1, 2016

(54) INFORMATION PROCESSING SYSTEM AND METHOD FOR DOCUMENT MANAGEMENT

(75) Inventor: Yuya Konno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 477 days.

(21) Appl. No.: 13/534,768

(22) Filed: Jun. 27, 2012

(65) Prior Publication Data

US 2013/0151953 A1     Jun. 13, 2013

(30) Foreign Application Priority Data

Dec. 9, 2011   (JP) .................................. 2011-270073

(51) Int. Cl.
*G06F 17/00* (2006.01)
*G06K 9/00* (2006.01)
*G06F 17/21* (2006.01)

(52) U.S. Cl.
CPC .......... *G06K 9/00463* (2013.01); *G06F 17/218* (2013.01)

(58) Field of Classification Search
CPC ... G06F 17/212; G06F 17/211; G06F 17/248; G06F 17/00; G06F 17/21; G06F 17/218; G06K 9/00463
USPC .......................... 715/243, 244, 245, 246, 247
See application file for complete search history.

(56) References Cited

U.S. PATENT DOCUMENTS

| 5,920,877 | A | * | 7/1999 | Kolster | ................. G06F 1/1616 715/235 |
| 6,525,749 | B1 | * | 2/2003 | Moran | .................... G06F 17/24 345/156 |
| 8,832,549 | B2 | * | 9/2014 | Mansfield et al. | ............ 715/243 |
| 8,837,818 | B2 | * | 9/2014 | Komaki | ........................ 382/159 |
| 2011/0271177 | A1 | * | 11/2011 | Bastos dos Santos et al. | ............................. 715/256 |

FOREIGN PATENT DOCUMENTS

| JP | B2-3578618 | 10/2004 |
| JP | B2-3767180 | 4/2006 |

* cited by examiner

*Primary Examiner* — Scott Baderman
*Assistant Examiner* — Hassan Mrabi
(74) *Attorney, Agent, or Firm* — Oliff PLC

(57) ABSTRACT

An information processing apparatus includes an acquisition unit that acquires region information, line information, and character information, a determination unit that determines whether or not a region is in left alignment, a first division unit that divides a region including a character indicated by character information into paragraph regions or itemized regions, an analysis unit that analyzes an indent of a line in a region determined as being in left alignment by the determination unit, a second division unit that divides the region determined as being in left alignment by the determination unit into paragraph regions or itemized regions, and an output unit that outputs the division result by the first division unit for the region determined as not being in left alignment by the determination unit, and the division result by the second division unit for the region determined as being in left alignment by the determination unit.

15 Claims, 21 Drawing Sheets

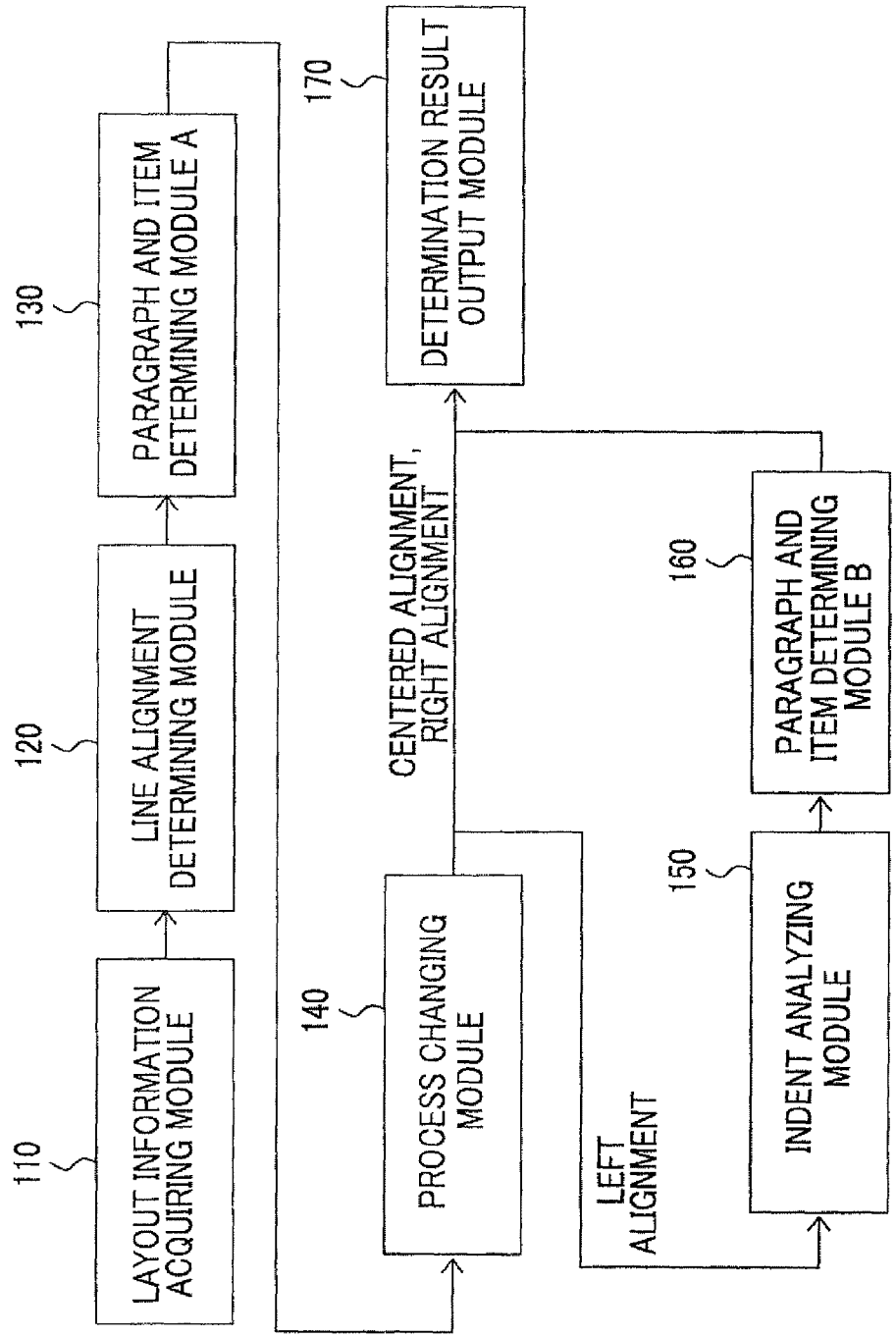

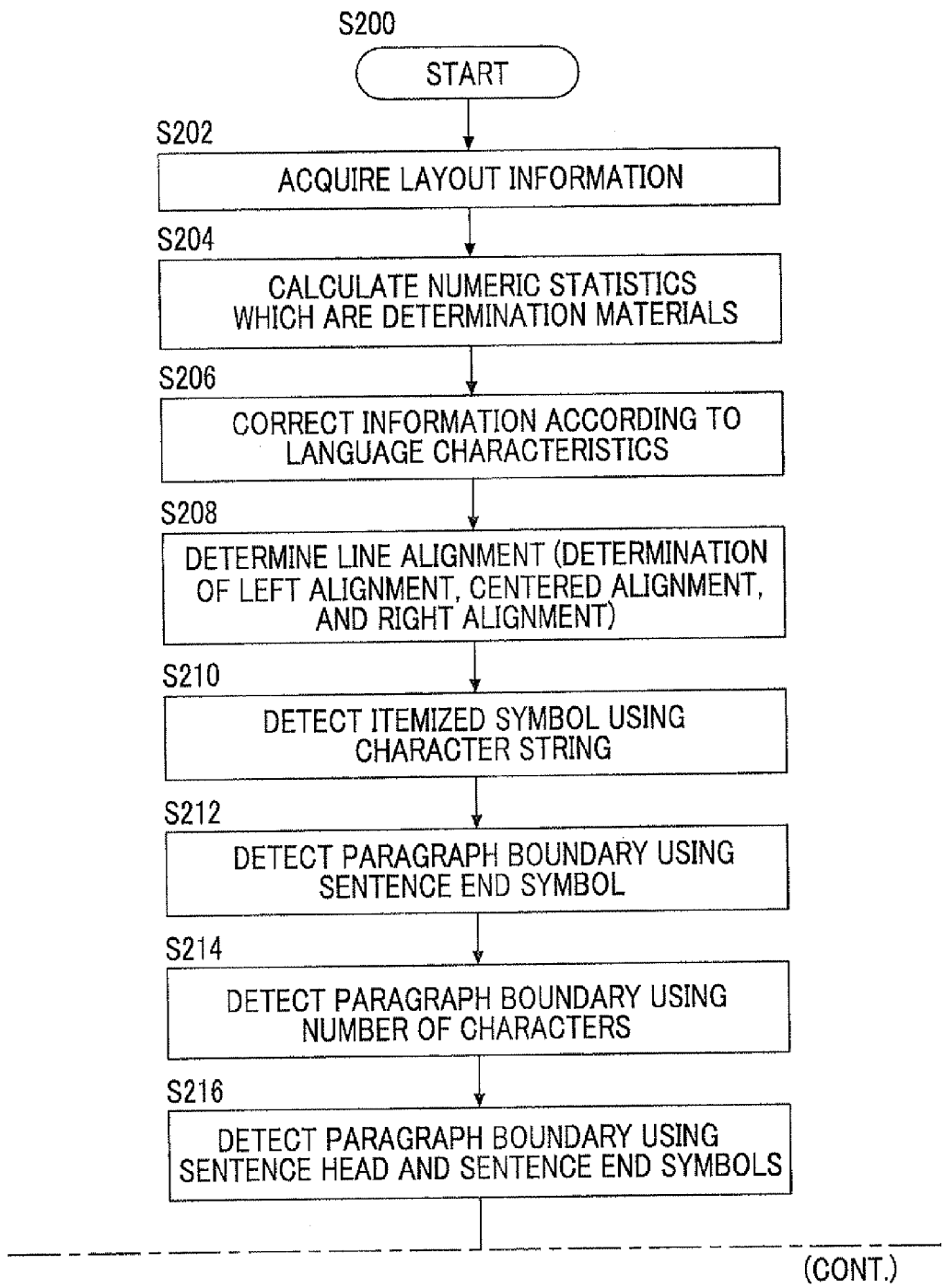

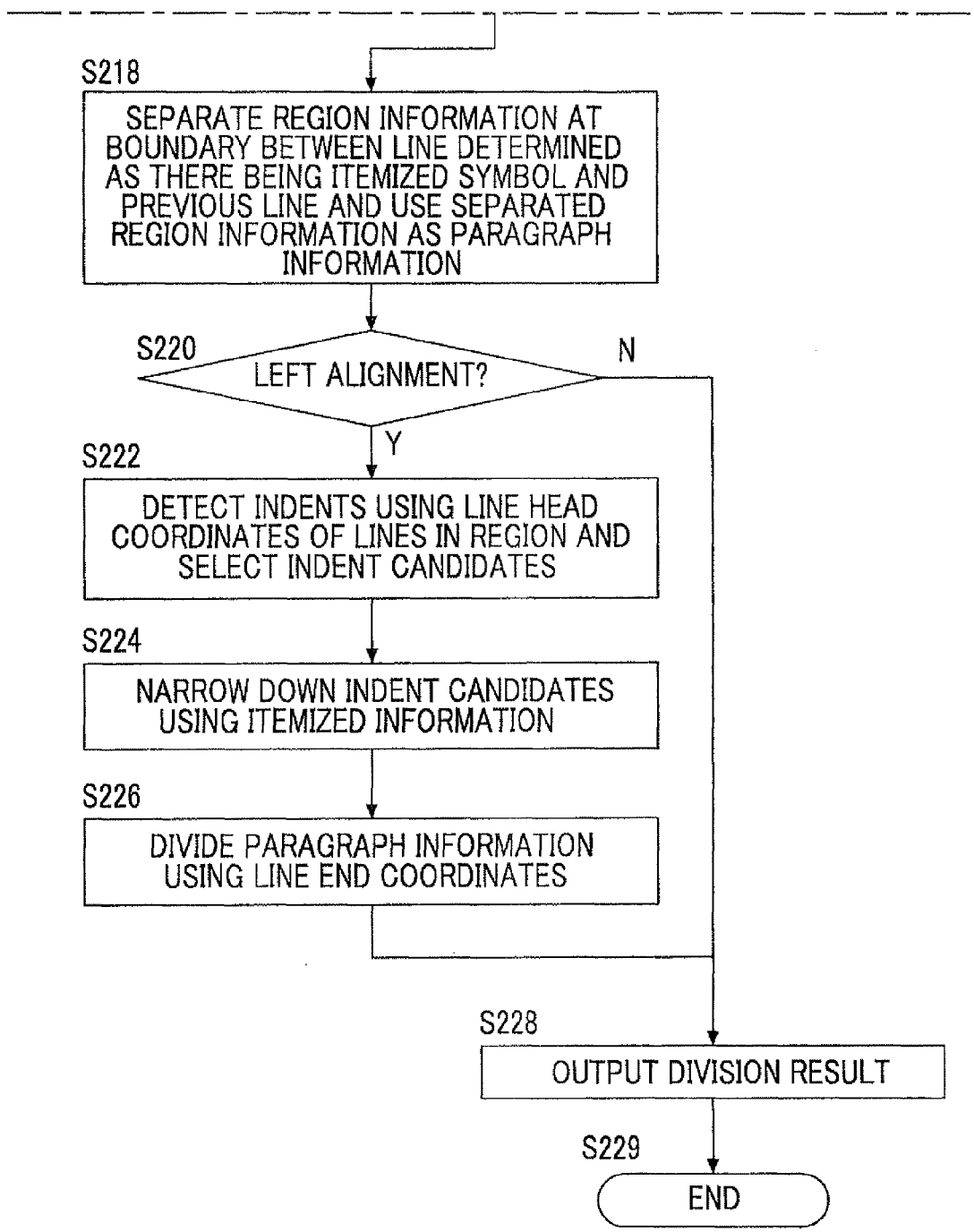

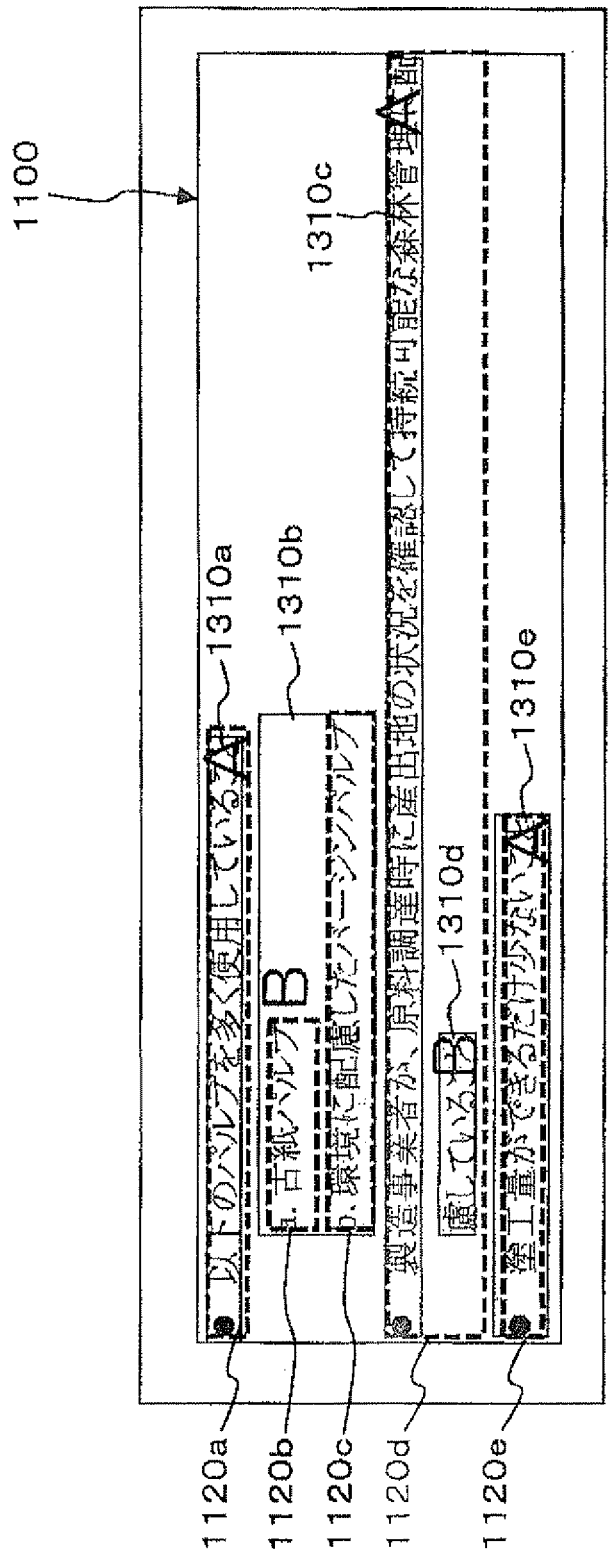

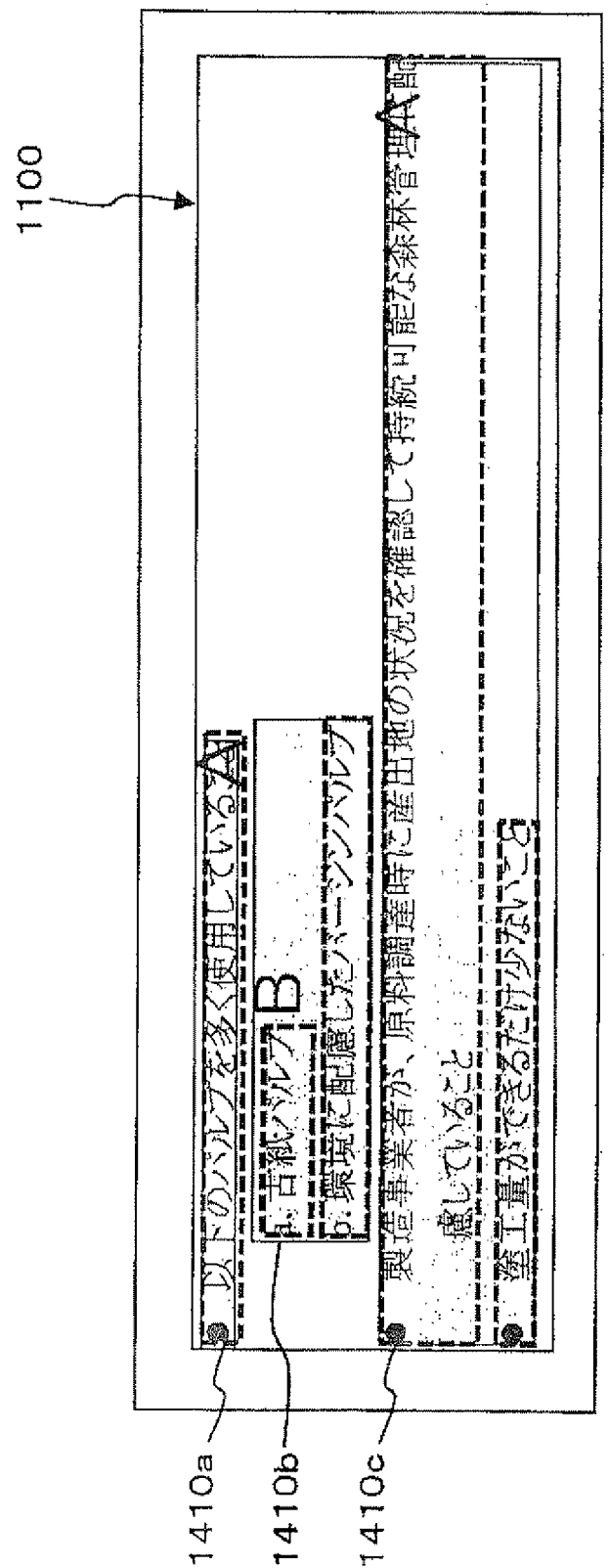

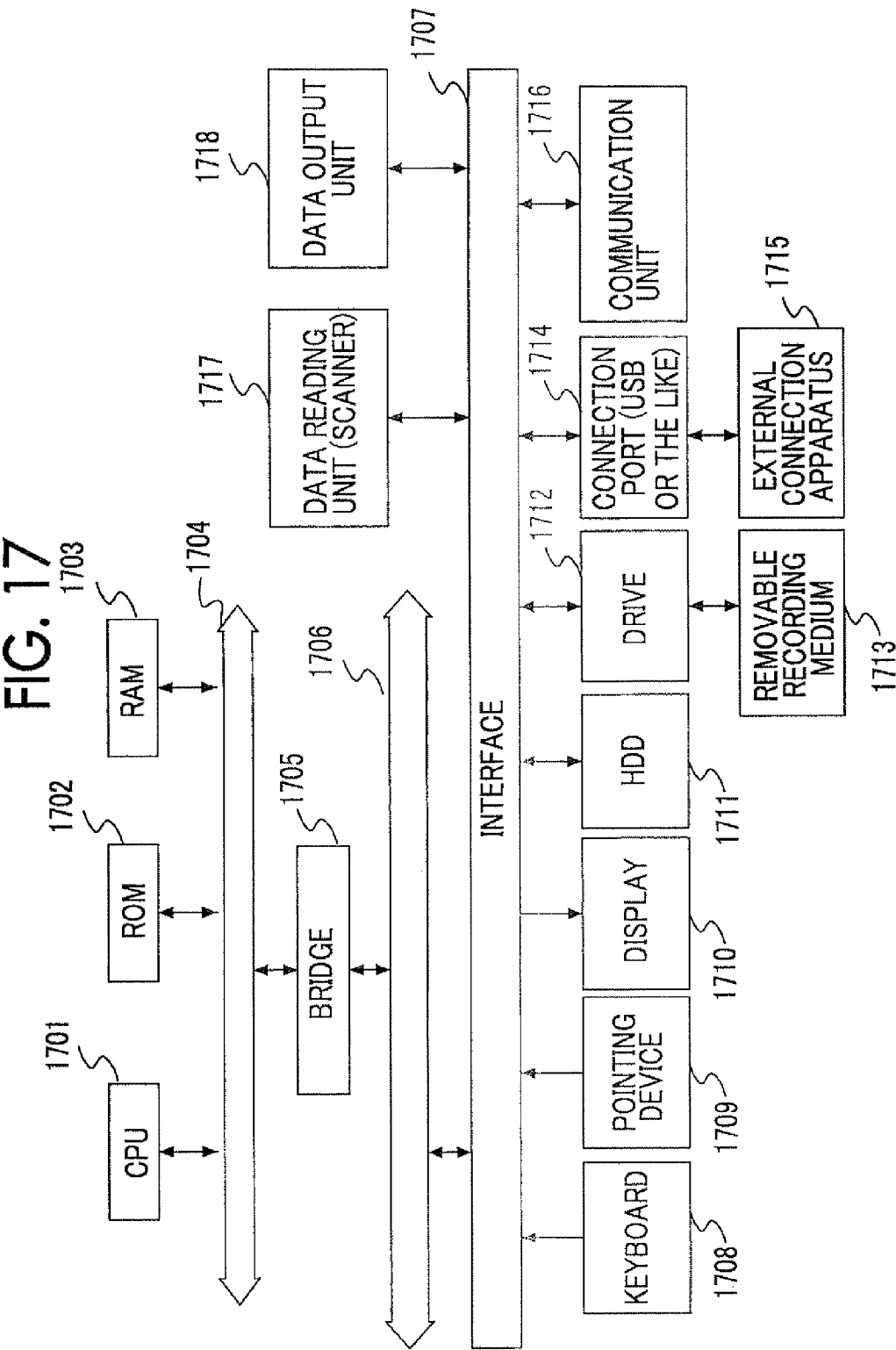

INFORMATION PROCESSING SYSTEM AND METHOD FOR DOCUMENT MANAGEMENT

CROSS-REFERENCE TO RELATED APPLICATIONS

This application is based on and claims priority under 35 USC 119 from Japanese Patent Application No. 2011-270073 filed Dec. 9, 2011.

BACKGROUND

Technical Field

The present invention relates to an information processing apparatus, and a non-transitory computer readable medium storing an information processing program.

SUMMARY

According to an aspect of the invention, there is provided an information processing apparatus including an acquisition unit that acquires region information which is information regarding a region in a document, line information which is information regarding a line in the region, and character information which is information regarding a character in the line, a determination unit that determines whether or not a region including a line indicated by line information is in left alignment on the basis of the line information acquired by the acquisition unit, a first division unit that divides a region including a character indicated by character information into paragraph regions or itemized regions on the basis of the character information acquired by the acquisition unit, an analysis unit that analyzes an indent of a line in a region determined as being in left alignment by the determination unit, a second division unit that divides the region determined as being in left alignment by the determination unit on the basis of the analysis result by the analysis unit, into paragraph regions or itemized regions, and an output unit that outputs the division result by the first division unit for the region determined as not being in left alignment by the determination unit, and the division result by the second division unit for the region determined as being in left alignment by the determination unit.

BRIEF DESCRIPTION OF THE DRAWINGS

Exemplary embodiments of the present invention will be described in detail based on the following figures, wherein:

FIG. 1 is a conceptual module configuration diagram regarding a configuration example of the exemplary embodiment;

FIG. 2 is a flowchart illustrating a process example according to the exemplary embodiment;

FIGS. 14A and 14B are diagrams illustrating a process example performed by the paragraph and item determining module B;

FIGS. 16A and 16B are diagrams illustrating a process example according to the exemplary embodiment; and FIG. 17 is a block diagram illustrating a configuration example of the computer hardware for realizing the exemplary embodiment.

DETAILED DESCRIPTION

Figure 3:
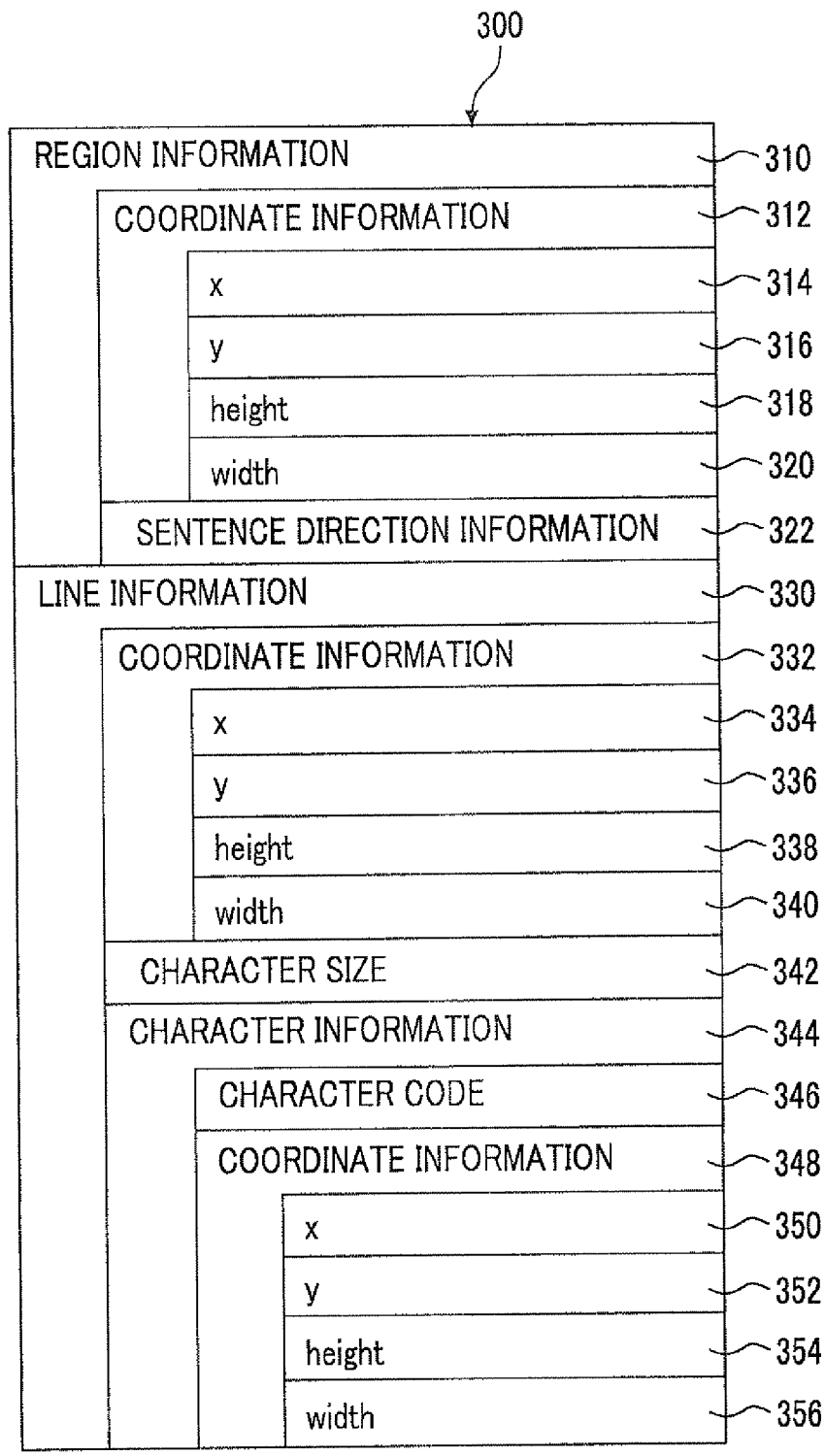
FIG. 3 is a diagram illustrating a data structure example of the information acquired by the layout information acquiring module.

Hereinafter, an exemplary embodiment for implementing the present invention will be described with reference to the drawings.

FIG. 1 is a conceptual module configuration diagram regarding a configuration example of the exemplary embodiment.

In addition, the module indicates components such as software (computer program) and hardware which may be generally and logically divided. Therefore, the module in the exemplary embodiment indicates not only a module in a computer program but also a module in a hardware configuration. Accordingly, the exemplary embodiment also includes description of a computer program for causing a computer to function as the module (a program for causing a computer to execute the respective procedures, a program for causing a computer to function as the respective units, or a program for causing a computer to realize the respective functions), a system, and a method. However, for convenience of the description, although the term "store", or "make store", and terms equivalent to it are used, these terms mean that, in a case where an exemplary embodiment is a computer program, it is stored in a storage device or is controlled so as to be stored in the storage device. In addition, the module may correspond to a function one to one. In a case of mounting, a single module may be configured by a single program, plural modules may be configured by a single program, or conversely a single module may be configured by plural programs. In addition, plural modules may be executed by a single computer, or a single module may be executed by plural computers using computers in distributed or parallel environments. Further, other modules may be included in a single module. Hereinafter, the term "connection" is used not only in a case of physical connection but also in a case of logical connection (data transmission and reception, instruction, reference relationship between data, and the like). The term "predefined" indicates being defined before a process which is a target, and is used to include a meaning of being defined according to circumstances or states at that time or according to circumstances or states hitherto as long as the process which is a target is not performed, even after a process according to the exemplary embodiment starts including a state where the process according to the exemplary embodiment does not start. Further, the phrase having a meaning that "in a case of A, B is performed" is used as a meaning that "whether or not there is A is determined, if it is determined that there is A, B is performed". However, a case where determination regarding whether or not there is A is unnecessary is excluded.

In addition, the system or the apparatus includes not only a case where plural computers, plural pieces of hardware, plural apparatuses, and the like are configured to be connected to each other via communication unit such as a network (including communication connection of one-to-one correspondence) but also a case where it is realized by a single computer, a piece of hardware, a single apparatus, and the like. The "apparatus" and the "system" are used as terms having the same meaning. Of course, the "system" does not include social "structures" (social systems) which are merely artificial arrangements.

In addition, for each process performed by each module, or for each process in a case where plural processes are performed in a module, information which is a target is read from a storage device, the process is performed, and then the process result is written in the storage device. Therefore, there are cases where description of reading from the storage device before the process and writing in the storage device after the process may be omitted. The storage device here may include a hard disk, a RAM (Random Access Memory), an external storage medium, a storage device via a communication line, a register in a CPU (Central Processing Unit), or the like.

The information processing apparatus according to the exemplary embodiment divides a region in a document into paragraph regions or itemized regions, and, as shown in the example of FIG. 1, includes a layout information acquiring module 110, a line alignment determining module 120, a paragraph and item determining module A 130, a process changing module 140, an indent analyzing module 150, a paragraph and item determining module B 160, and a determination result output module 170.

The layout information acquiring module 110 is connected to the line alignment determining module 120. The layout information acquiring module 110 acquires region information which is information regarding a region in a document, line information which is information regarding a line in the region, and character information which is information regarding a character in the line.

In addition, the document includes at least text data. In some cases, the document is electronic data such as an image, a moving image and audio or a combination thereof, is stored, edited and searched for, indicates one which may be exchanged as the individual unit between systems or users, and includes ones similar thereto.

The regions an the document indicate that, for example, a document as an image is read with a scanner and is divided into regions by analyzing the image. Information received by the layout information acquiring module 110 corresponds to data which is a result recognized through character recognition of the image of the document or PDF (Portable Document Format) (registered trademark). In addition, there are cases where a region which may be divided into paragraph regions or itemized regions is included in the region. There are cases where there is wrong character information in the character information. For example, in a case of a character recognition result through character recognition, there may be misrecognition. Particularly, there are cases where a leading character of an item is misrecognized. In addition, the character includes a symbol and the like.

Detailed examples of the region information, the line information, and the character information will be described later with reference to FIGS. 3 and 4.

Acquisition of region information, line information, and character information may receive a result obtained through structure recognition or character recognition after an image is read with, for example, a scanner or a camera (or after an image is received from an external apparatus with a facsimile via a communication line). In addition, region information, line information, and character information which are stored in a hard disk (embedded in a computer and including ones connected via a network) or the like may be read.

The line alignment determining module 120 is connected to the layout information acquiring module 110 and the paragraph and item determining module A 130. The line alignment determining module 120 determines whether or not a region including a line indicated by line information is aligned in the left based on the line information acquired by the layout information acquiring module 110. A detailed example of this process will be described later using examples of FIGS. 5 and 8 to 10.

The line alignment determining module 120 may calculate coordinates of a midpoint of a line indicated by line information on the basis of the line information acquired by the layout information acquiring module 110, and may determine whether or not the region is aligned in the left based on one or more of coordinates of the right end, coordinates of the midpoint and coordinates of the left end of the line in the region.

In addition, the line alignment determining module 120 may determine whether the region is in one of left alignment, centered alignment or right alignment.

In a case where a target language is a language which is not regulated such that line ends are aligned, the line alignment determining module 120 may change line information on the basis of character information of characters in the next line of a line indicated by the line information and then may determine whether or not a region including the line indicated by the line information is aligned in the left. A detailed example of this process will be described later using examples of FIGS. 6 and 7.

In addition, here, the "language which is not regulated such that line ends are aligned" is a language of which line ends are not generally aligned. Of course, although, even in the language, a line end happens to be aligned, in a case where there are plural lines, if the line ends are not generally aligned, the language corresponds to a "language which is not regulated such that line ends are aligned". More specifically, the language corresponds to the English language, the Korean language, and the like. On the other hand, the Japanese language, the Chinese language, and the like principally have aligned line ends. In addition, exceptionally, line ends are not aligned in a case where a paragraph finishes in the middle of the line and a process such as hanging is performed such that a punctuation mark is not put in a line head, but, in a case where there are plural lines, if the line ends are generally aligned, the language does not correspond to a "language which is not regulated such that line ends are aligned". In addition, the "change of line information" refers to changing information (in a case of horizontal writing, the width 340 of the layout information 300, and, in a case of vertical writing, the height 338 of the layout information 300) indicating the length of a line in the line information.

Determination regarding whether or not to correspond to the language may be performed based on characters in character information. For example, there is a difference in a range of character codes used in a language according to the character codes, and thus a range of a character code of which language the character code which is used belongs to may be determined. In addition, in a case where a language is set in advance, the determination may be performed according to the setting. The setting includes a flag or the like storing a value corresponding to a language.

The paragraph and item determining module A 130 is connected to the line alignment determining module 120 and the process changing module 140. The paragraph and item determining module A 130 divides a region including characters indicated by character information into paragraph regions or itemized regions on the basis of the character information acquired by the layout information acquiring module 110. A detailed example of this process will be described later using an example of FIG. 11.

A division result by the paragraph and item determining module B 160 which is output by the determination result output module 170 is obtained by the paragraph and item determining module B 160 performing a division process for the division result by the paragraph and item determining module A 130.

The paragraph and item determining module A 130 may divide a region into paragraph regions or itemized regions on the basis of whether or not a character string of one or more characters existing in a line head or a line end satisfies a predefined character string condition. In addition, the character string includes not only a case of plural characters but also a case of a single character.

Further, the paragraph and item determining module A 130 may divide a region into paragraph regions or itemized regions on the basis of whether or not a value which is predefined as the number of characters of a line in the region satisfies a predefined condition.

The process changing module 140 is connected to the paragraph and item determining module A 130, the indent analyzing module 150, and the determination result output module 170. The process changing module 140 sends region information, line information and character information for a region which is determined as being in left alignment by the line alignment determining module 120, to the indent analyzing module 150. In addition, a division result (region information, line information and character information for a region) by the paragraph and item determining module A 130 for the region which is determined as not being in left alignment by the line alignment determining module 120 is sent to the determination result output module 170. In addition, a region including characters is determined as either of being in left alignment and not being in left alignment.

The indent analyzing module 150 is connected to the process changing module 140 and the paragraph and item determining module B 160. The indent analyzing module 150 analyzes an indent of the line in the region which is determined as being in left alignment by the line alignment determining module 120. A detailed example of this process will be described later using examples of FIGS. 12 and 13.

The indent analyzing module 150 may analyze an indent of the line by classifying each line into a line which is indented and a line which is not indented on the basis of a distance from the left end of the region to the left end of each line in the region.

The paragraph and item determining module B 160 is connected to the indent analyzing module 150 and the determination result output module 170. The paragraph and item determining module B 160 divides the region which is determined as being in left alignment by the line alignment determining module 120 into paragraph regions or itemized regions on the basis of an analysis result by the indent analyzing module 150. A detailed example of this process will be described later using examples of FIGS. 14A to 15B.

The paragraph and item determining module B 160 may divide the region into paragraph regions or itemized regions on the basis of whether or not a predefined character string is included in a character string included in a line and whether or not a boundary of the classification which is an analysis result by the indent analyzing module 150 overlaps a boundary of a paragraph.

The determination result output module 170 is connected to the process changing module 140 and the paragraph and item determining module B 160. The determination result output module 170 outputs the division result by the paragraph and item determining module A 130 for the region determined as not being in left alignment by the line alignment determining module 120 and the division result by the paragraph and item determining module B 160 for the region determined as being in left alignment by the line alignment determining module 120.

There are cases where either of the division result by the paragraph and item determining module A 130 and the division result by the paragraph and item determining module B 160 is omitted. Therefore, the determination result output module 170 may output either of the division result by the paragraph and item determining module A 130 and the division result by the paragraph and item determining module B 160, or both of the division result by the paragraph and item determining module A 130 and the division result by the paragraph and item determining module B 160.

The output of the division result includes, for example, writing the division result in a storage device such as a document database as information regarding a document, storing the division result in a storage medium such as a memory card, sending the division result to the other information processing apparatuses (for example, an information processing apparatus performing an interpretation process and the like), and the like.

In addition, either of the line alignment determining module 120 and the paragraph and item determining module A 130 may first perform a process, or may perform processes in parallel.

FIG. 2 is a flowchart illustrating a process example according to the exemplary embodiment.

In step S202, the layout information acquiring module 110 acquires layout information. The layout information includes the above-described region information, line information and character information.

FIG. 3 is a diagram illustrating a data structure example of the information acquired by the layout information acquiring module 110. The layout information 300 includes region information 310 and line information 330. Here, an example where the region is a rectangular region is shown. In addition, the line information 330 stores information indicating a line in a region which is indicated by region information in the region information 310. The region information 310 includes coordinate information 312 and sentence direction information 322 as information regarding the region. The coordinate information 312 stores a position and a size of the region. The coordinate information 312 includes x 314, y 316, height 318, and width 320. The x 314 stores an x coordinate of upper left coordinates of the region. The y 316 stores a left y coordinate of the region. The height 318 stores a height of the region. The width 320 stores a width of the region. In addition, although the x and y coordinates of upper left coordinates, the height, and the width are exemplified as the coordinate information, other pieces of information, for example, x and y coordinates of upper right coordinates, a height, and a width may be used, and x and y coordinates of upper left coordinates and x and y coordinates of lower right coordinates may be used, as long as the information indicate positions of the rectangle. Hereinafter, this is also same for information in coordinate information 332 and coordinate information 348. The sentence direction information 322 stores a direction of a sentence (line direction) in the region. The sentence direction includes horizontal writing and vertical writing. In addition, in relation to the horizontal writing, a direction from left to right and a direction from right to left may be included. Specifically, symbols indicating horizontal writing, vertical writing, and the like are stored.

The line information 330 includes coordinate information 332, a character size 342, and character information 344 for each line included in the region. Therefore, in a case where there are plural lines in the region, there are plural pieces of line information 330. The coordinate information 332 stores a position and a size of the line. Here, an example where the line is a rectangular region is shown. The coordinate information 332 includes x 334, y 336, height 338, and width 340. The x 334 stores a left x coordinate of the line. The y 336 stores a y coordinate of upper left coordinates of the line. The height 338 stores a height of the line. The width 340 stores a width of the line. The character size 342 stores a size of a character included in the line. For example, there are a point size, a dot size, and the like.

The character information 344 stores information regarding characters included in the line for each character. Therefore, in a case where there are plural characters in the line, there are plural pieces of character information 344. The character information 344 includes a character code 346 and coordinate information 348. The character code 346 stores a character code indicating the character. The coordinate information 348 includes x 350, y 352, height 354, and width 356. Here, an example where the character is a rectangular region is shown. The x 350 stores a left x coordinate of the character. The y 352 stores a y coordinate of upper left coordinates of the character. The height 354 stores a height of the character. The width 356 stores a width of the character.

The information acquired by the layout information acquiring module 110 is obtained, for example, by integrating two or more process results of document layout analysis, character recognition, and electronic document extraction. For example, the region information is a process result of the layout analysis, and the line information and the character information are process results of the character recognition or the electronic document extraction. Specifically, when an image obtained by scanning a document is a target, the line information and the character information are results of the character recognition, and when an electronic document is a target, character codes in the document are first acquired, and character recognition is performed for portions with no character codes so as to acquire a recognition result thereof.

Figure 4:
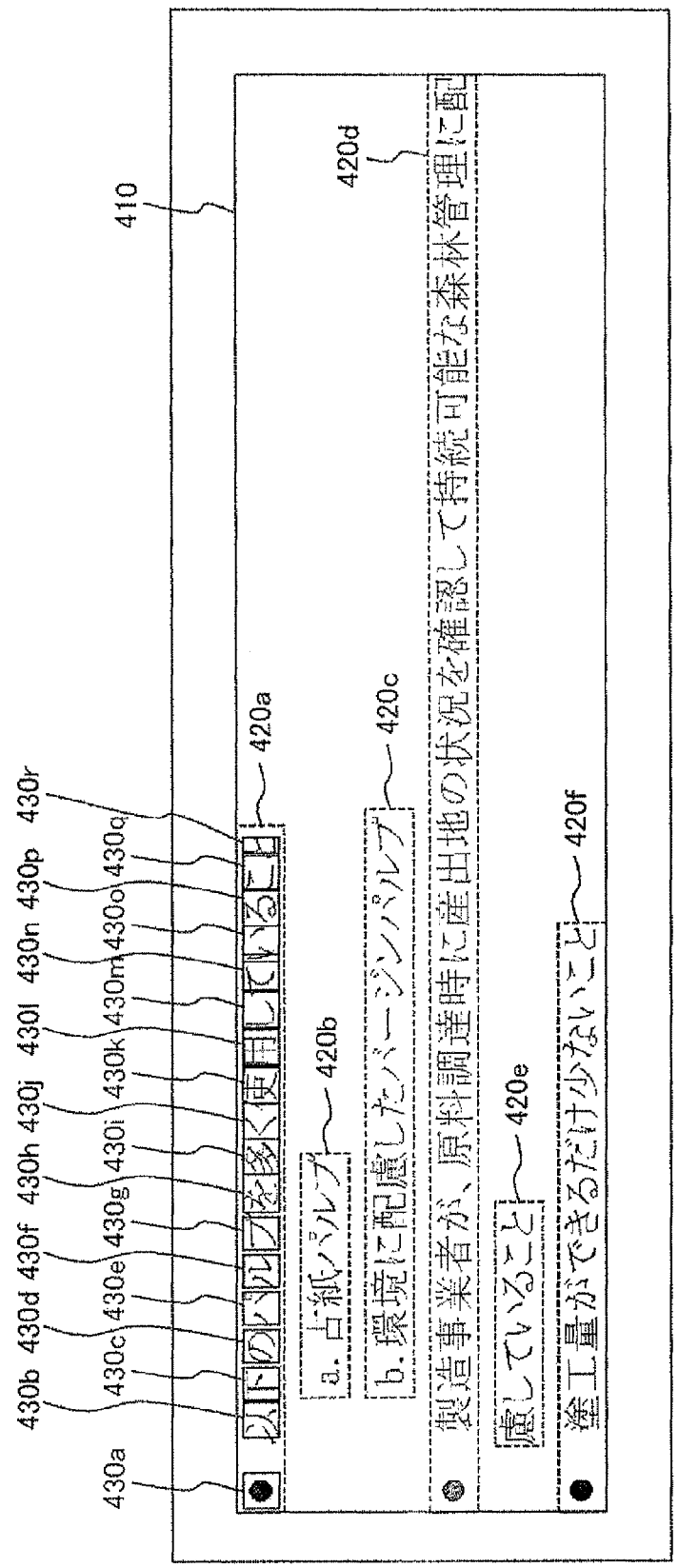
FIG. 4 is a diagram illustrating an example of the information acquired by the layout information acquiring module.

FIG. 4 is a diagram illustrating an example of the information acquired by the layout information acquiring module 110. In the region information 410, there are three items as a whole, the first item includes two items (line information 420b and 420c), and there is an indented line as shown in line information 420e.

The region information 410 includes six pieces of line information of the line information 420a to the line information 420f. In addition, the line information 420 includes eighteen pieces of character information of character information 430a to character information 430r. Further, in the example of FIG. 4, although character information in the line information after the line information 420b is omitted, character information is included in each line.

In step S204, the line alignment determining module 120 calculates numeric statistics which are determination materials. Here, an example where two, a character size in a region and midpoint coordinates of a line are calculated is shown. At least midpoint coordinates of a line may be calculated, and other pieces of information may be calculated.

In relation to the character size in the region, character sizes in the regions are acquired, and a mode is calculated and is used as a representative character size in the region. In addition to the mode, a mean value or median may be used. This value may be used as a reference for a subsequent correction or determination process. Further, as a countermeasure against a case such as large characters being partially mixed, the mode is employed. In addition, for example, when there is a different character size, a line including the character may be separated as a different line, and in a case where a difference in the character size between lines is greater than a predefined value, a region may be separated such that the character with a different size is not included in the same region.

Figure 5:
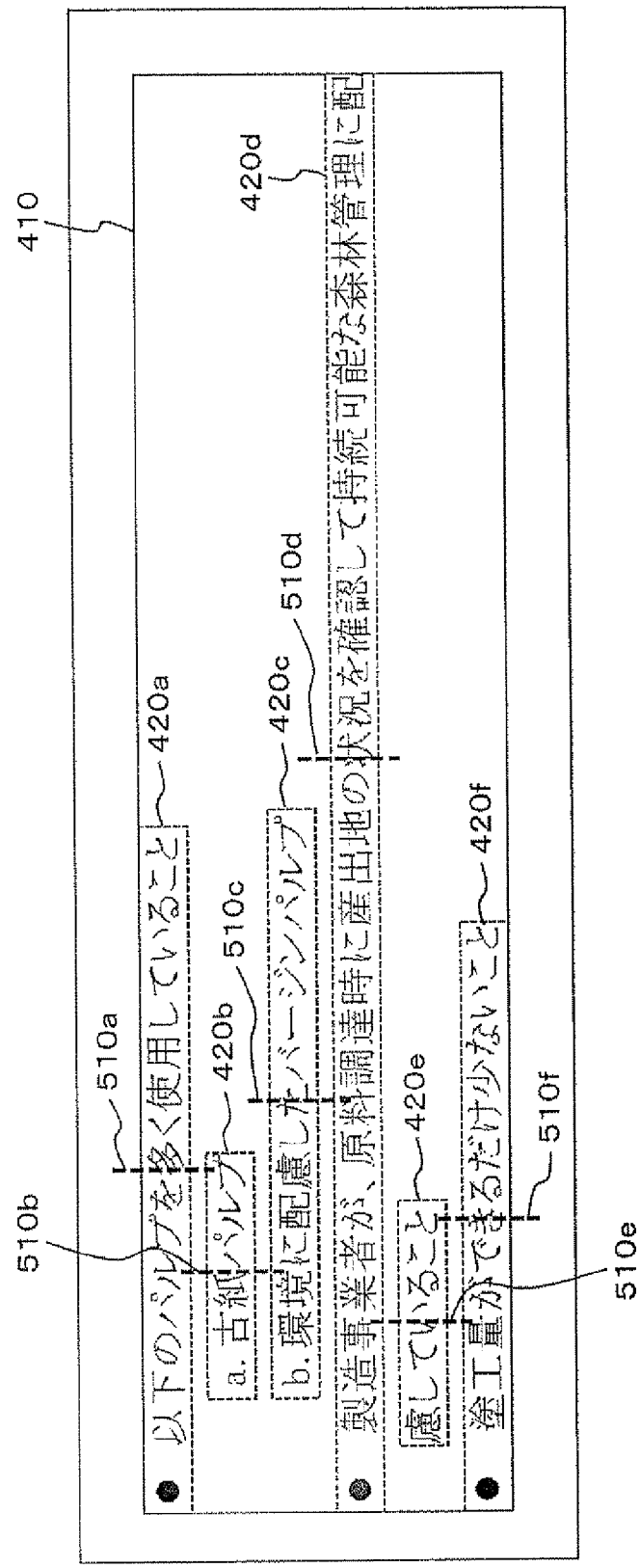
FIG. 5 is a diagram illustrating a process example performed by the line alignment determining module.

A direction where midpoint coordinates are calculated is defined based on the sentence direction information. Specifically, the vertical writing is put in the Y axis direction, and the horizontal writing is put in the X axis direction. Here, the calculated value is used for determination of line alignment in step S208. FIG. 5 is a diagram illustrating a process example (a calculation processing example of midpoint coordinates) performed by the line alignment determining module 120. Midpoints of the line information 420a to the line information 420f are respectively midpoint coordinates 510a to midpoint coordinates 510f.

In step S206, the line alignment determining module 120 corrects information according to language characteristics. In addition, the process in step S206 may be omitted. For example, in a case where a language (the Japanese language, the Chinese language, and the like) which is regulated such that line ends are aligned is a target, the process in step S206 is omitted. Further, whether or not a language is a language (the English language, the Korean language, and the like) which is not regulated such that line ends are aligned may be determined. This determination may be performed using character codes as described above.

Figure 6:
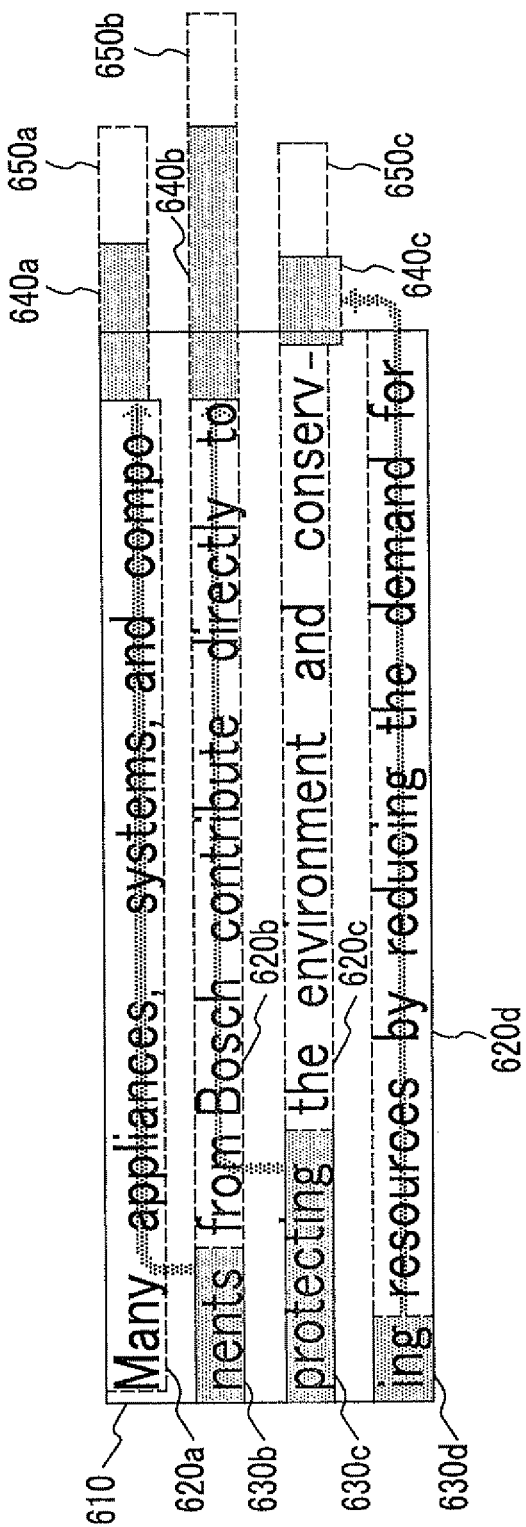
FIG. 6 is a diagram illustrating a process example performed by the line alignment determining module.
Figure 7:
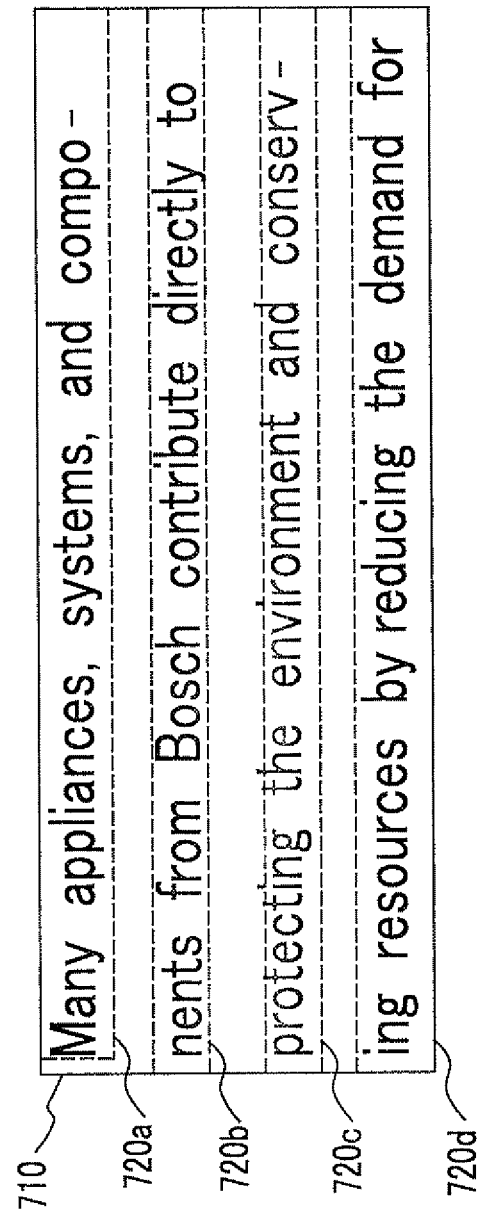
FIG. 7 is a diagram illustrating a process example performed by the line alignment determining module.

Since line ends may not be aligned in a language (the English language, the Korean language, and the like) which is not regulated such that line ends are aligned, correction is made so as to be same as a process in a language (the Japanese language, the Chinese language, and the like) which is regulated such that line ends are aligned. FIGS. 6 and 7 are diagrams illustrating a process example performed by the line alignment determining module 120 when the sentence direction information indicates horizontal writing. In addition, when the sentence direction information indicates vertical writing, a process of rotating rightward by 90 degrees is executed.

First, a width of a starting word in the next line of a target line is acquired from the character information. The acquired word width and a value of an adjustment width are added to the width of the target line as width information in the line information, and it is determined whether or not the line information exceeds a region width. If it is determined that the line information exceeds the region width in this process, the line information is extended to an end of the region information.

Specifically, the width of the starting word in the next line is a width up to a word segmented by a space in the next line (a line located directly under the target line in the horizontal writing, and a line located directly on the left of the target line in the vertical writing) of the target line, and is added to the target line. In addition, the value of the adjustment width which is a predefined value is added thereto. In this state, it is determined whether or not the target line is included in the region. In the example of FIG. 6, the starting word width 630b (next line starting word width 640a) in the next line information 620b of the line information 620a and the adjustment width 650a are added to the right end (x coordinate) of the line information 620a. It is determined whether or not this result exceeds the right end of the region information 610. In the example shown in FIG. 6, it is determined that the line information 620a, the line information 620b, and the line information 620c in the region information 610 exceed the right end of the region information 610. The right end of the line information 620d matches with the right end of the region information 610, and thus this process is not necessary. In addition, the adjustment width may be defined based on a representative character size in the region. Since there are cases where characters are arranged by adjusting a size of a space, such an adjustment width is provided. For example, the adjustment width may be a length corresponding to three characters of the representative character size.

In addition, if it is determined that the target line is not included in the region including the line, the width of the line information indicating the line is corrected such that the right end of the line matches with the right end of the region. In the example shown in FIG. 7, the right ends of the line information 720a, the line information 720b, and the line information 720c in the region information 710 are extended to the right end of the region information 710.

Figure 8:
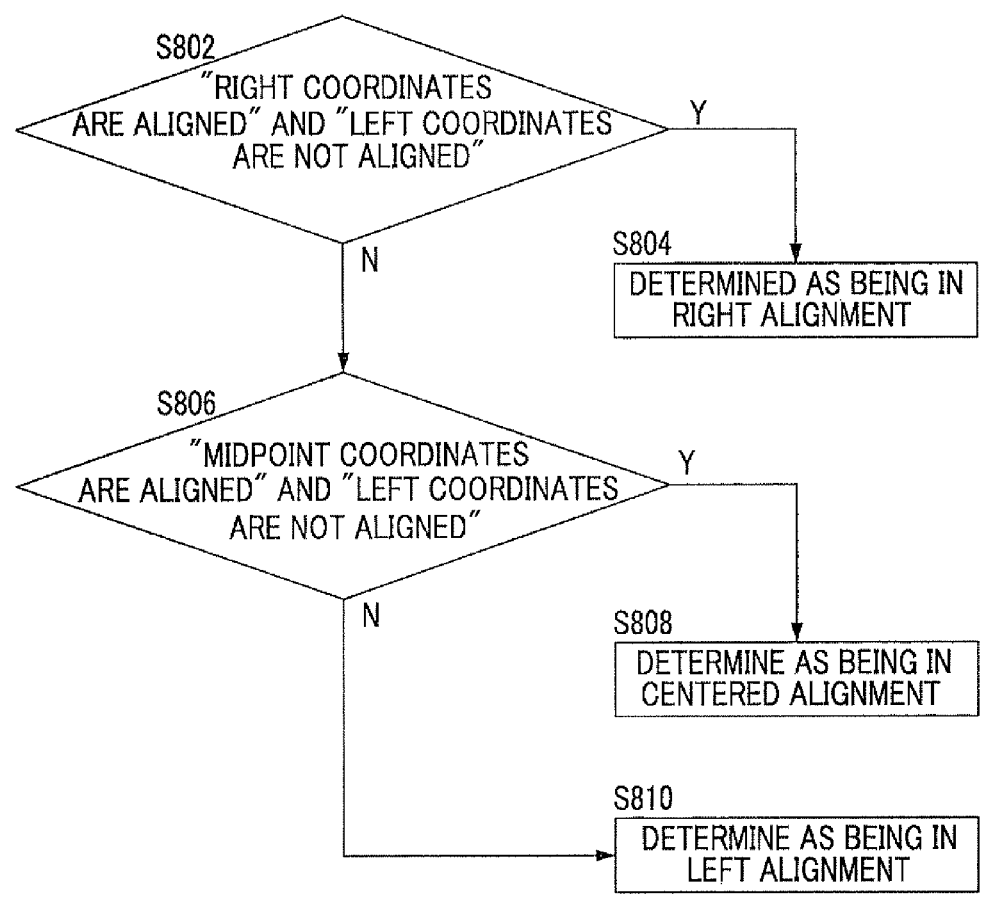
FIG. 8 is a flowchart illustrating a process example performed by the line alignment determining module.
Figure 9:
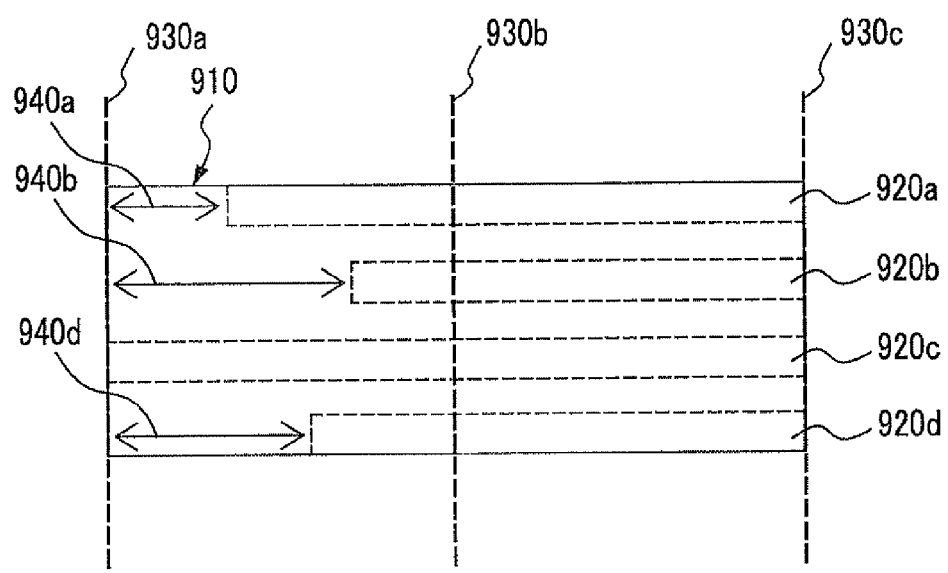
FIG. 9 is a diagram illustrating a process example performed by the line alignment determining module.
Figure 10:
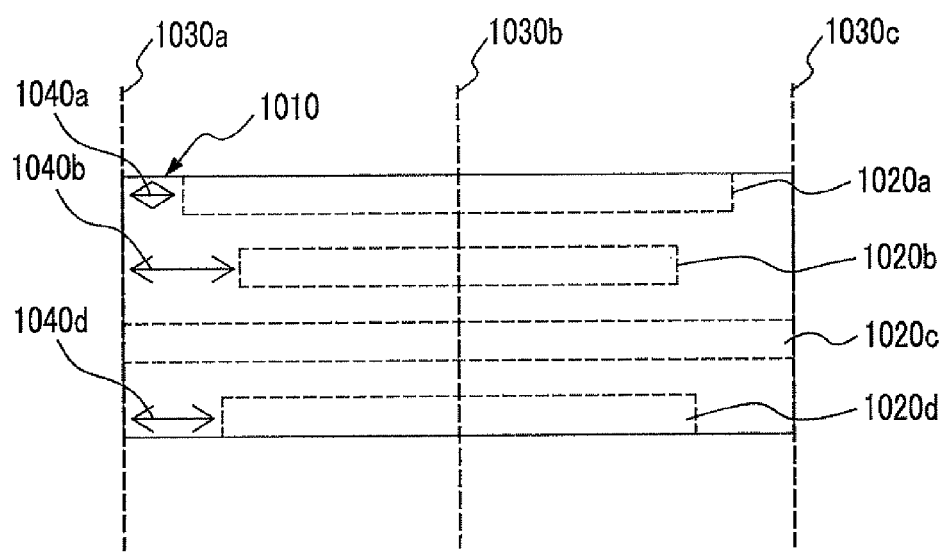
FIG. 10 is a diagram illustrating a process example performed by the line alignment determining module.

In step S208, the line alignment determining module 120 determines line alignment (determines left alignment, centered alignment, and right alignment). The determination is performed from coordinates of the line head, the line end, and the midpoint in the region. When the sentence direction information indicates the horizontal writing, the coordinate of the line head is an x coordinate of the left end of the line, the coordinate of the line end is an x coordinate of the right end of the line, and the coordinate of the midpoint is an x coordinate of the midpoint calculated in step S204. The examples shown in FIGS. 8, 9 and 10 are used to describe a case of the horizontal writing, and, when the sentence direction information indicates the vertical writing, the equivalent process may be performed through right rotation by 90 degrees. In addition, in a case where there is only one line in the region, left alignment is determined.

FIG. 8 is a flowchart illustrating an example of the process in step S208 performed by the line alignment determining module 120.

In step S802, the line alignment determining module 120 determines whether or not "a right coordinate (the x coordinate of the right end of the line) is aligned" and whether or not "a left coordinate (the x coordinate of the left end of the line) is not aligned", and if the condition is satisfied, the flow proceeds to step S804, and, otherwise, the flow proceeds to step S806. Here, in the "determination of being or not being aligned", differences from region coordinates are calculated, and if a variance of the differences is smaller than a predefined value, being aligned is determined. For example, the predefined value may be 2.5 characters of the representative character size. This is also the same for the following step S806. In addition, using the condition that the left coordinate is not aligned is intended to determine a case where sentences tightly fill a rectangle as "left alignment".

In step S804, the line alignment determining module 120 determines the region as being in right alignment.

In the example shown in FIG. 9, since a variance of the left gap information 940a, the left gap information 940b and the left gap information 940d which are differences between the left coordinates and the left end coordinates of the region coordinates is larger than a predefined value, it is determined that "the left coordinates are not aligned", and since the right coordinates of the respective lines match with the region right information 930c, it is determined that "the right coordinates are aligned", and, the region information 910 is determined as being in right alignment in step S804.

In step S806, the line alignment determining module 120 determines whether or not "the midpoint coordinate is aligned" and whether or not "the left coordinate is not aligned", and if so, the flow proceeds to step S808, and otherwise, the flow proceeds to step S810.

In step S808, the line alignment determining module 120 determines the region as being in the centered alignment.

In the example shown in FIG. 10, since a variance of the left gap information 1040a, the left gap information 1040b and the left gap information 1040d which are differences between the left coordinates and the left end coordinates of the region coordinates is larger than a predefined value, it is determined that "the left coordinates are not aligned", and since the midpoint coordinates of the respective lines match with the region midpoint information 1030b, it is determined that "the midpoint coordinates are aligned", and the region information 1010 is determined as being in the centered alignment in step S808.

In step S810, the line alignment determining module 120 determines that the region is in left alignment. In addition, the left alignment is not determined using a condition that left coordinates are aligned since there are cases where a paragraph is indented in a sentence.

In addition, the determination is performed in order of steps S802 and S806, but may be performed in reverse order thereof, and discrimination may be performed through one determination using a condition obtained by combining them.

In step S210, the paragraph and item determining module A 130 detects an itemized symbol using a character string.

The itemized symbol is detected by comparing a character string which is a predefined number of characters from a line head with a character string which is a predefined number of characters from a line end in the region information.

For example, if the following conditions are satisfied, the itemized symbol is recognized. In addition, coordinate information is not used in order to be detected even in a case where a paragraph is indented using the same itemized symbol. However, the coordinate information may be used.

(1) When a predefined itemized symbol exists in a sentence head, whether or not it is an itemized symbol based on whether or not a leading character string is a predetermined character string. However, the symbol is determined as the itemized symbol, limited to a case where there are plural lines beginning with the same symbol in the region. This is because separation errors due to misrecognition of character recognition are reduced.

For example, the symbol is denoted by regular expressions as a predefined character string, and corresponds to "[•¥——+ *○☆✕©●□■◇◆△▲▼.?]" and the like.

(2) When an itemized symbol with a parenthesis exists in a sentence head, whether or not a leading character string is surrounded by a parenthesis is detected, and if there are plural lines beginning with character strings surrounded by the same parenthesis in the region, the symbol is determined as an itemized symbol.

For example, the symbol is denoted by regular expressions as a predefined character string, and corresponds to "[(¥[<]" and the like. The symbol is denoted by regular expressions as an end parenthesis, and corresponds to "[)¥]>]" and the like. In addition, parenthesis symbols ("half angle bracket", and "settled parenthesis (also called bracket)" used to write paragraph numbers) which cannot be used in the specification may be included.

The number of characters to be determined may be set to a predefined number. For example, the predefined number may be a range within four characters from the head.

(3) When alphanumeric characters exist in a sentence head and satisfy the conditions Condition (3-1)

"An initial character is an alphanumeric character, a the Chinese numeral or a Roman character" and "a second character is any one of "..--"".

In addition, if there are plural lines satisfying the former condition and a character code of the initial character continuously exists, an item is determined. For example, if "A", "B", or the like continuously exists, it is detected.

Condition (3-2)

"A line where numbers continuously exist from an initial character"

When there are plural lines satisfying the condition, and the numbers are replaced with numerical values and are arranged in order of the numerical values, if a difference between the adjacent numerical values as lines is 0 or 1, an item is determined. In addition, since only second half characters such as, for example, "12-1" and "12-2" may be changed, there are cases where a difference (a difference between the initial numbers 12 and 12) is 0.

In step S212, the paragraph and item determining module A 130 detects a paragraph boundary using a sentence end symbol.

If a sentence of the previous line ends with a punctuation mark or a period, it is determined that a paragraph boundary exists therebetween. Detected sentence end strings are predefined.

For example, the sentence end strings are denoted by regular expressions as predefined character strings and may be ".?!".

In addition, a condition that a sentence beginning is indented in the next line may be added. This is because a paragraph is prevented from being determined as being segmented at a portion which is not a paragraph boundary in a sentence where a punctuation mark happens to be disposed at the end of a line.

In step S214, the paragraph and item determining module A 130 detects a paragraph boundary using the number of characters.

In a case where an average character number of a line in the region is smaller than a predefined value, it is determined that words are enumerated, and all the lines are separated as an independent line (a boundary of each line is used as a paragraph boundary). In addition, in the English language, the number of words segmented by a space is targeted. For example, as a predefined value, the average character number may be eight characters in a case of the Japanese language, the Chinese language, and the Korean language, and may be three words in a case of the English language. Here, as a condition, when a numeric string in one line is entirely constituted by "+[.'.¥$%-]" (regular expressions), the numeric string may be separated regardless of the number of characters. This is aimed at handling a table or the like with no ruled line.

In step S214, it is determined whether or not characters are characters in a cell of the table, and if the characters are characters in a cell of the table, this process may not be performed for the characters. This is aimed at handling that characters in a cell are irregularly arranged.

In step S216, the paragraph and item determining module A 130 detects a paragraph boundary using symbols existing at the sentence beginning and the sentence end.

This is a countermeasure against enumeration of sentences surrounded by parentheses. If a character of the line head and a character of the line end are corresponding parentheses, the line is determined as an independent line and thus is divided (a boundary of the line is used as a paragraph boundary).

For example, there are [ ], ⌈ ⌋, ( ), " ", and ' ' as predefined parenthesis characters, and a line surrounded by one of them is targeted.

In addition, the processes from step S210 to S216 may be processes of one or more steps of them. In addition, the processes from step S210 to step S216 may not be sequentially performed. For example, the processes may be performed in reverse order or may be performed in parallel. In addition, instead of these processes, or along with these processes, the techniques disclosed in the related art documents may be used.

In step S218, the paragraph and item determining module A 130 separates the region information at a boundary between a line determined as there being an itemized symbol and the previous line, and uses the separated region information as paragraph information. The region information is separated using the paragraph boundaries detected through the processes from step S210 to step S216, and is used as paragraph information.

The information detected through the processes from step S210 to step S216 is integrated and the sentence is separated for each piece of paragraph information. The line where the itemized symbol is detected is separated since the sentence is determined as being segmented before the line. The information is separated using the paragraph boundary as a boundary.

Figure 11:
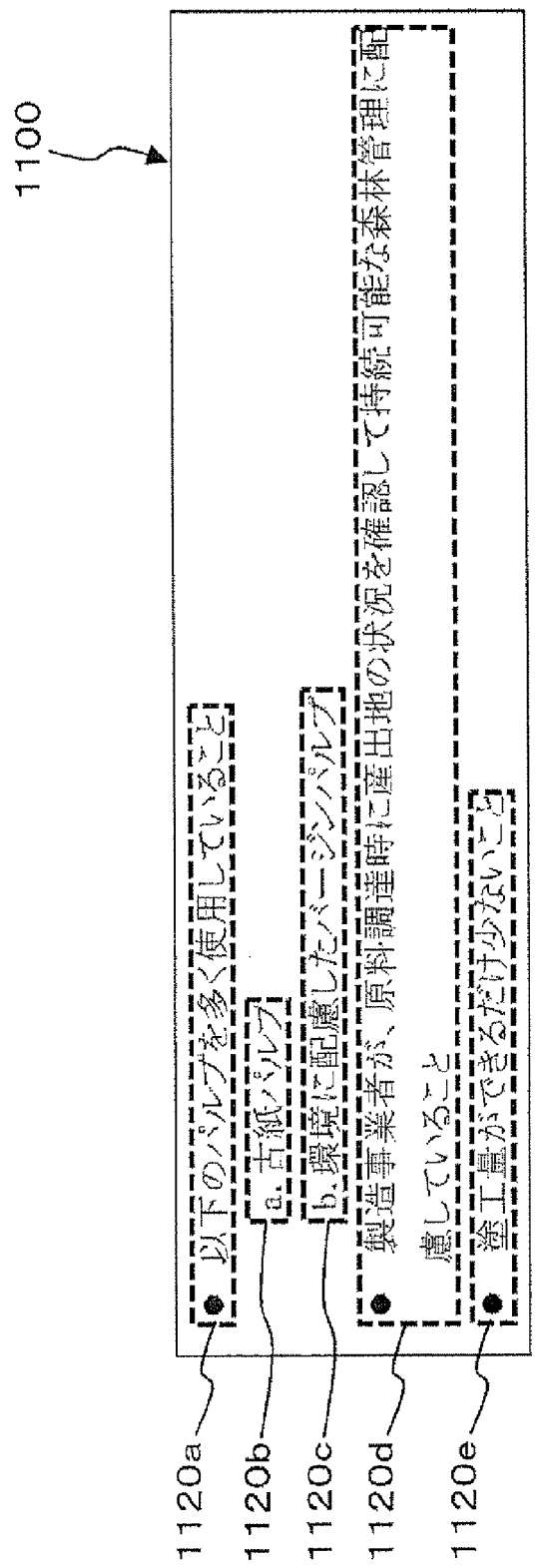
FIG. 11 is a diagram illustrating a process example performed by the paragraph and item determining module A.

At this time, the region information is summarized for each "paragraph region" such as the paragraph information 1120a to 1120e surrounded by the dotted lines as shown in the example of FIG. 11.

In step S220, the process changing module 140 determines whether or not the region is in left alignment (upper alignment in a case of vertical writing), and if the region is in left alignment (upper alignment), the flow proceeds to step S222. Otherwise, the flow proceeds to step S228.

If the region information to be processed is determined as being in left alignment in step S208, determination processes (processes from step S222 to step S226) regarding whether or not the sentence in the region information is indented is additionally performed. In a case of centered alignment and right alignment, the flow proceeds to step S228. In a case of the vertical writing, the flow proceeds to step S222 in the upper alignment, and, otherwise, the flow proceeds to step S228.

In step S222, the indent analyzing module 150 detects indents using line head coordinates of the lines in the region and selects indent candidates.

The lines are grouped using a distance between the left end coordinate of the region and the left end coordinate of the line included in the region.

Figure 12:
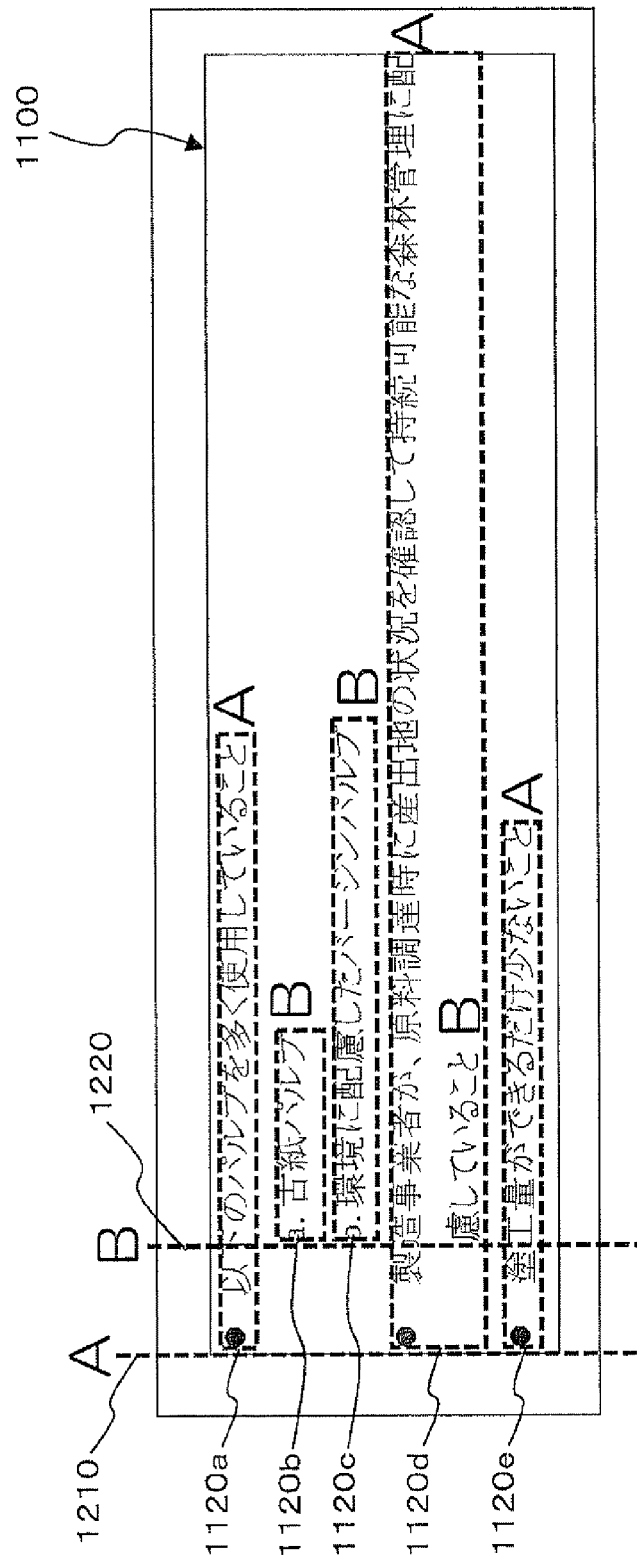
FIG. 12 is a diagram illustrating a process example performed by the indent analyzing module.

FIG. 12 is a diagram illustrating a process example performed by the indent analyzing module 150. The region information 1100 includes five paragraphs of the paragraph information 1120a to 1120e. In addition, the paragraph information 1120d includes two lines. The other paragraphs respectively include only one line.

A distance from the left end of the region information 1100 to the left end of the line in the paragraph information 1120a is 0 (region left coordinate A: 1210; that is, they overlap each other). Similarly, a distance from the left end of the region information 1100 to the first line in the paragraph information 1120*d* and the left end of the line in the paragraph information 1120*e* is 0, and they form a group A. A distance from the left end of the region information 1100 to the left end of the line in the paragraph information 1120*b*, a distance from the left end of the region information 1100 to the left end of the line in the paragraph information 1120*c*, and a distance (region indent coordinate B: 1220) from the left end of the region information 1100 to the left end of the second line in the paragraph information 1120*d* are the same, and thus they form a group B. Here, the same distance indicates that a difference between the compared distances is within a predefined value. For example, the difference may be within 0.7 characters of a representative character size in the region.

In addition, the line groups are sequentially inspected, and indent candidates are selected at boundaries where one group is changed to another group. That is to say, if lines included in the same group are continuously arranged, the plural lines become the same indent candidate.

Figure 13:
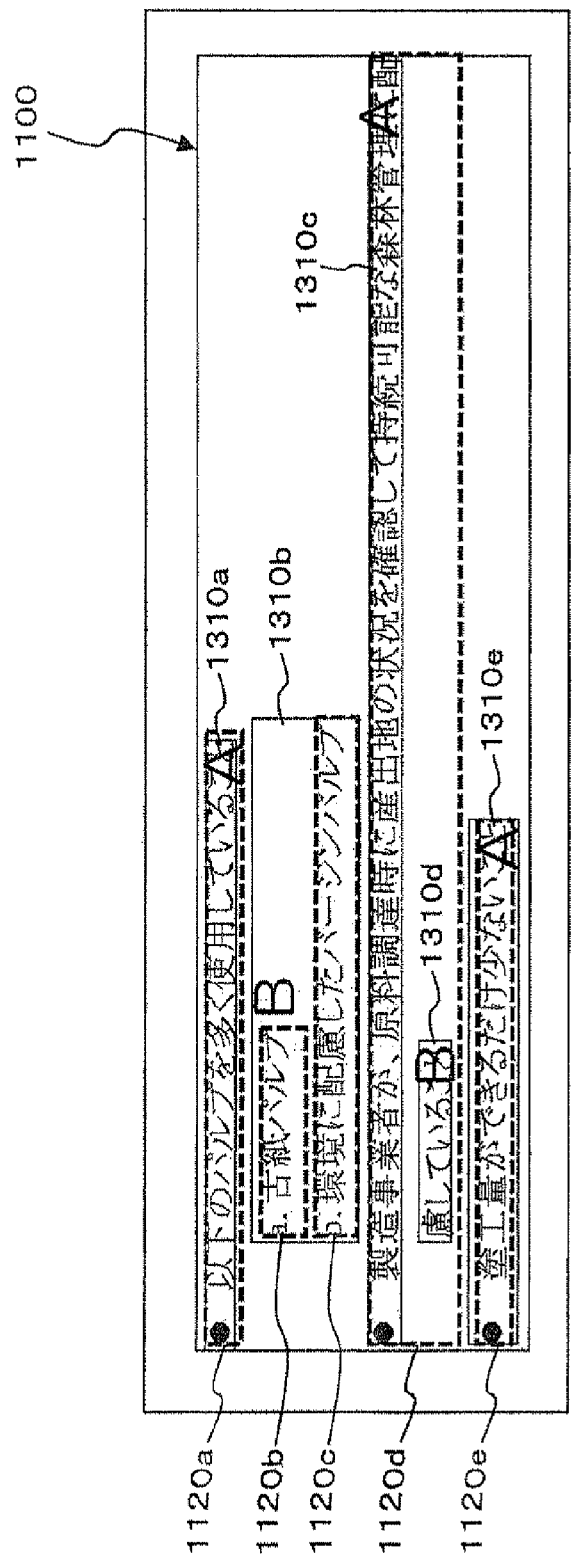
FIG. 13 is a diagram illustrating a process example performed by the indent analyzing module.

Specifically, in the example shown in FIG. 12, the indent candidates are selected at the boundary between the line in the paragraph information 1120*a* and the line in the paragraph information 1120*b*, the boundary between the line in the paragraph information 1120*c* and the first line in the paragraph information 1120*d*, the boundary between the first line in the paragraph information 1120*d* and the second line in the paragraph information 1120*d*, and the boundary between the second line in the paragraph information 1120*d* and the line in the paragraph information 1120*e*. Therefore, there are five indent candidates in the region information 1100. Specifically, as shown in the example of FIG. 13, the paragraph information 1120*a* overlaps the indent candidate information 1310*a*, and the paragraph information 1120*b* and the paragraph information 1120*c* are included in the indent candidate information 1310*b*. Conversely, the indent candidate information 1310*c* and the indent candidate information 1310*d* are included in the paragraph information 1120*d*, and the paragraph information 1120*e* overlaps the indent candidate information 1310*e*. In addition, there is a possibility that the indent candidate may include one which is not an indent. In the following steps, an indent is selected from the indent candidates.

In addition, in a case of the vertical writing, an indent may be detected using an upper end coordinate.

In addition, when a distance from the left end of the region to the left end of the line is equal to or more than a threshold value, a line of the indent candidate may be selected. The threshold value for determining a line of the indent candidate is predefined. For example, a line where a distance from the left end of the region to the left end of the line is equal to or more than 2.5 characters of a representative character size in the region is used as a line of the indent candidate. In the example shown in FIG. 12, the group B has a distance (the region indent coordinate B: 1220) from the left end of the region to the left end of the line which is equal to or more than 2.5 characters, and thus the line in the paragraph information 1120*b*, the line in the paragraph information 1120*c*, and the second line in the paragraph information 1120*d* become lines of the indent candidates.

In step S224, the paragraph and item determining module B 160 narrows down the indent candidates using itemized information.

If the boundaries of the indent candidates divided into the groups in step S222 satisfy the following two conditions, the boundaries are treated as being absent, and the following indent candidate group is included in the preceding indent candidate group.

(Condition 1) A predefined itemized symbol (the itemized symbol used in step S210 and the like) is included in a line before the boundary.

(Condition 2) A boundary of the paragraph and a boundary of the indent candidate do not overlap each other.

A detailed description thereof will be made. As shown in the example of FIG. 14A, in the region information 1100, there are five paragraphs (paragraph information 1120*a* to 1120*e*) and five indent candidates (indent candidate information 1310*a* to 1310*e*). The target boundaries of the indent candidates are the boundary between the indent candidate information 1310*a* and the indent candidate information 1310*b*, the boundary between the indent candidate information 1310*b* and the indent candidate information 1310*c*, the boundary between the indent candidate information 1310*c* and the indent candidate information 1310*d*, and the boundary between the indent candidate information 1310*d* and the indent candidate information 1310*e*. A boundary satisfying the conditions 1 and 2 is the boundary between the indent candidate information 1310*c* and the indent candidate information 1310*d*. That is to say, the predefined itemized symbol "●" is included in the indent candidate information 1310*c*. In addition, there is no paragraph boundary which exists at the same position as the boundary between the indent candidate information 1310*c* and the indent candidate information 1310*d*. This is because the indent candidate information 1310*c* and the indent candidate information 1310*d* are included in the paragraph information 1120*d*.

Therefore, the indent candidate information 1310*d* belongs to the group B but is changed to belong to the group A which is a group of the indent candidate information 1310*c*, and the indent candidate information 1310*c* and the indent candidate information 1310*d* are treated as a single indent candidate.

In addition, the indent candidate division performed in step S222 is performed. That is to say, the line groups are sequentially inspected, and if lines included in the same group are continuously arranged, plural lines become the same indent candidate. Specifically, since the indent candidate information 1310*d* is changed to belong to the group A, the indent candidate information 1310*c*, the indent candidate information 1310*d*, and the indent candidate information 1310*e* belong to the same group A and are continuously arranged, and thus they are treated as indent candidates of the group A. An indent candidate in a state after this is applied to the lines in the region information 1100 becomes an indent (itemized region).

The example shown in FIG. 14A is also applied to the example shown in FIG. 14B. That is to say, there are three indents (itemized regions) of the indent information 1410*a* formed by only the first line in the region information 1100, the indent information 1410*b* formed by the second line and the third line in the region information 1100, and the indent information 1410*c* formed by the fourth line, the fifth line and the sixth line in the region information 1100. The indent information 1410*a* belongs to the group A, the indent information 1410*b* belongs to the group B, and the indent information 1410*c* belongs to the group A.

In addition, in a case where a boundary of the indent candidate exists between the first line and the second line in the region, and the first line is arranged under the second line (so-called reverse indent state; specifically, in a case of the vertical writing, the first line is located further on the right side than the second line, and in a case of the horizontal writing, the first line is located to be lower than the second line), the group of the first line may be changed to the group of the second group. This is a countermeasure against a case where an indent width of the paragraph beginning is large, and this is because the first line is to be determined as not being an indent.

In step S226, the paragraph and item determining module B 160 divides the paragraph information using line end information.

For each paragraph, line end coordinates of the continuous lines are compared. If the line end of the following line is lower than a predefined value from the line end of the preceding line (in a case of the horizontal writing, a state where the line end of the following line is further on the right side than the line end of the preceding line, and in a case of the vertical writing, a state where the line end of the following line is located to be lower than the line end of the preceding line), the paragraph information is divided assuming that a boundary of the paragraphs exists between the compared lines. As a predefined value, there are, for example, three or more characters, and the like. In addition, although there are cases where line ends are not aligned in the English language, correction is made in step S206, and thus the process in step S226 may be performed as it is.

Figure 15A:
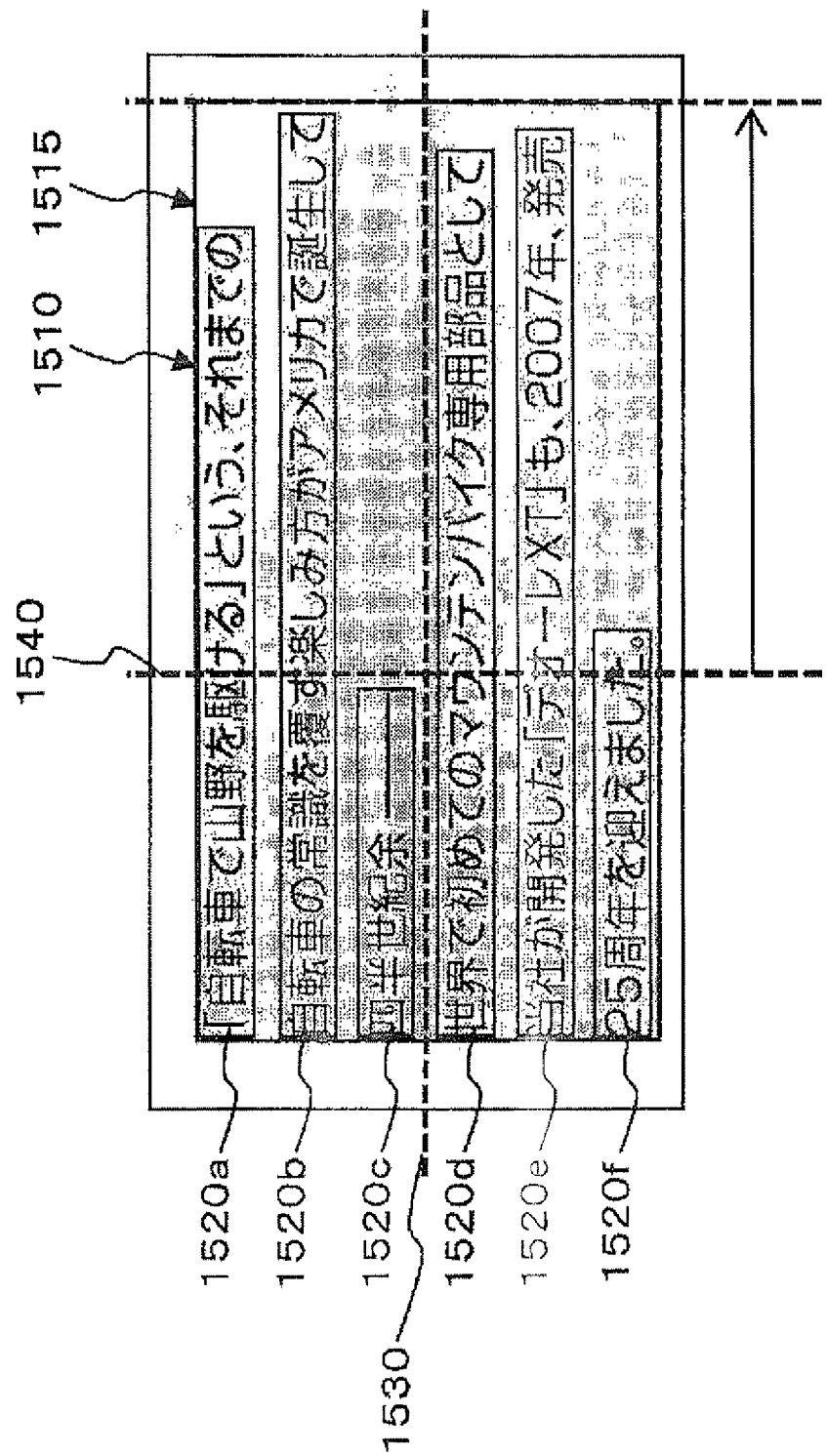
FIGS. 15A and 15B are diagrams illustrating a process example performed by the paragraph and item determining module B.
Figure 15B:
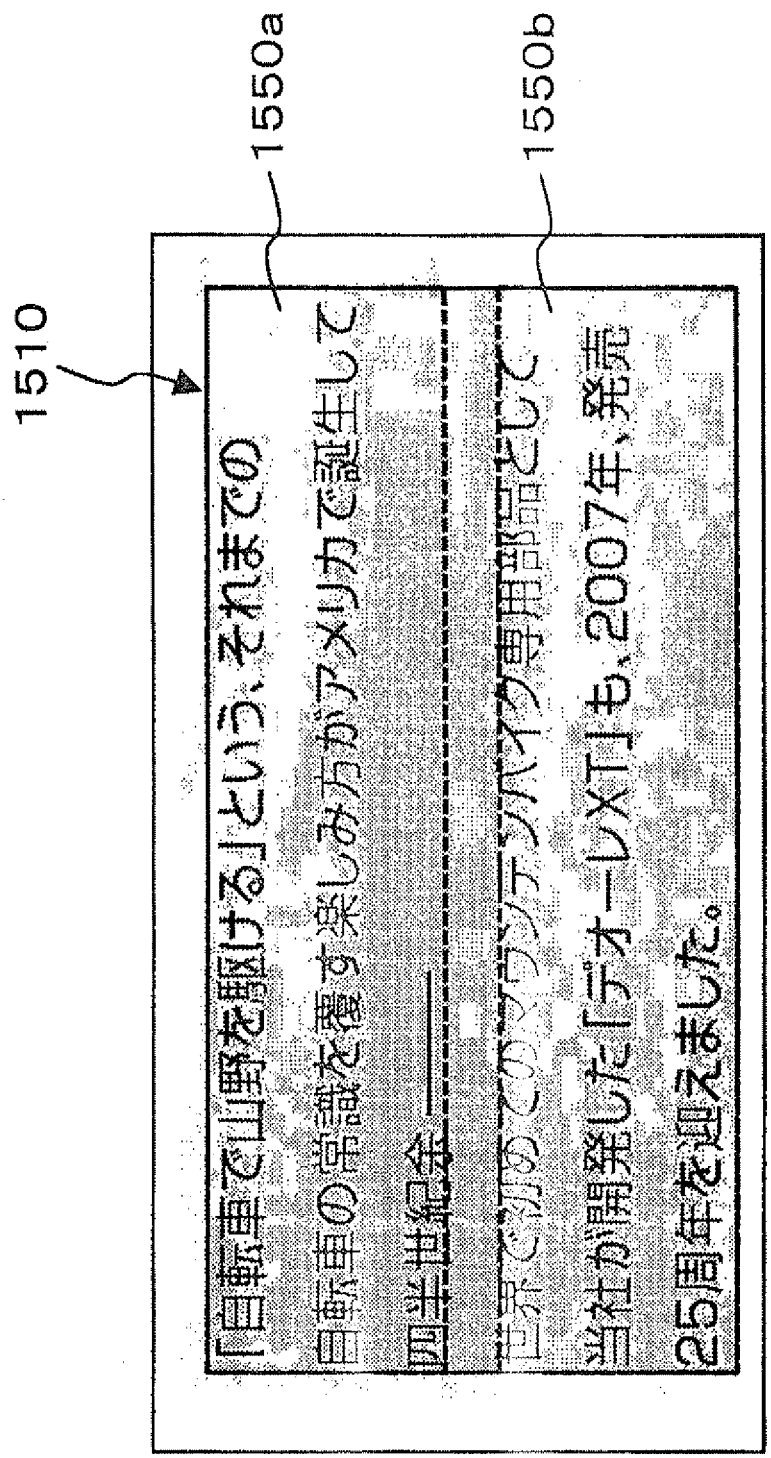

A detailed description thereof will be made. As shown in the example of FIG. 15A, through comparison of the line end coordinates of the line information 1520c and the line information 1520d, it is found that the line end of the line information 1520d is located further on the right side than the line end (the line information 1540) of the line information 1520c by a predefined value or more. Therefore, the paragraph information 1515 is divided between the line information 1520c and the line information 1520d (the line boundary information 1530). As in the example shown in FIG. 15B, there are two paragraphs of the paragraph information 1550a and the paragraph information 1550b in the region information 1510.

In addition, when the number of lines in the region is smaller than a predefined value, the process in step S226 may be omitted. There are, for example, three lines or less and the like as the predefined value. A region constituted by few lines has a high possibility of being a title. Since line ends are not generally aligned in a title, the process in step S226 is excluded.

In step S228, the determination result output module 170 outputs the division result. A result for the region which is in left alignment is obtained through the processes from step S222 to step S226, and a result for the region which is not in left alignment is obtained through the process in step S218.

Figure 16B:
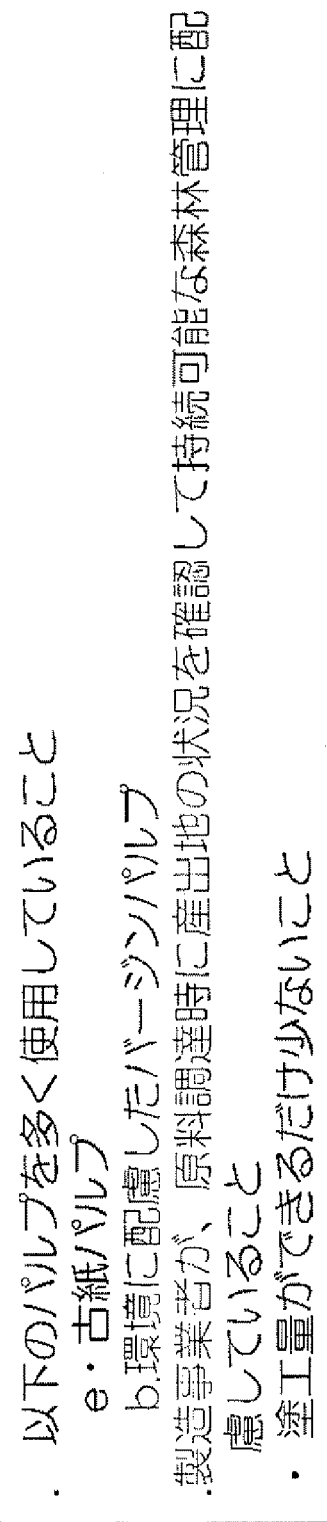

In the above-described examples, a case where the layout information acquired by the layout information acquiring module 110 does not include wrong characters is mainly described. However, there are cases where a character recognition result is acquired as layout information acquired by the layout information acquiring module 110. For example, a result obtained by performing structure recognition and character recognition for the target image 1610 shown in FIG. 16A is a recognition result 1620 shown in FIG. 16B. Information regarding the recognition result 1620 is acquired as the layout information in step S202. Since symbols may be misrecognized in the character recognition technique, there are cases where itemized symbols or character strings indicating items may not be correctly acquired. Since only character codes are referred to in the process performed by the paragraph and item determining module A 130, it is difficult to find a break of a sentence which is misrecognized. In the exemplary embodiment, as process performed by the indent analyzing module 150 and the paragraph and item determining module B 160, information of a character string and positional information of a line are combined and analyzed.

With reference to FIG. 17, a hardware configuration example of the information processing apparatus according to the exemplary embodiment will be described. A configuration shown in FIG. 17 is implemented by, for example, a personal computer (PC) or the like, and is a hardware configuration example including a data reading unit 1717 such as a scanner and a data output unit 1718 such as a printer.

A CPU (Central Processing Unit) 1701 is a controller which executes processes according to a computer program which describes execution sequences of a variety of modules described in the above embodiment, that is, the layout information acquiring module 110, the line alignment determining module 120, the paragraph and item determining module A 130, the process changing module 140, the indent analyzing module 150, the paragraph and item determining module B 160, and the determination result output module 170.

A ROM (Read Only Memory) 1702 stores programs or operation parameters used by the CPU 1701. A RAM (Random Access Memory) 1703 stores programs used for execution of the CPU 1701 or parameters which are appropriately varied in the execution. They are connected to each other via a host bus 1704 constituted by a CPU bus.

The host bus 1704 is connected to an external bus 1706 such as a PCI (Peripheral Component Interconnect/Interface) bus via a bridge 1705.

A keyboard 1708 and a pointing device 1709 such as a mouse are input devices operated by an operator. A display 1710 includes a liquid crystal display, a CRT (Cathode Ray Tube), or the like, and displays a variety of information as text or image information.

An HDD (Hard Disk Drive) 1711 has a hard disk embedded therein, drives the hard disk, and records or reproduces a program or information executed by the CPU 1701. The hard disk stores layout information received by the layout information acquiring module 110, a process result by the paragraph and item determining module A 130, and the like. In addition, a variety of computer programs such as various other data processing programs are stored therein.

A drive 1712 reads data or a program recorded on a removable recording medium 1713 such as a magnetic disk, an optical disc, a magneto-optical disc, or a semiconductor memory which is installed therein, and supplies the data and the program to the RAM 1703 which is connected thereto via the interface 1707, the external bus 1706, the bridge 1705, and the host bus 1704. The removable recording medium 1713 may be also used as a data recording region in the same manner as the hard disk.

A connection port 1714 is a port for connection to an external connection apparatus 1715 and has a connection unit such as a USB, or IEEE1394. The connection port 1714 is connected to the CPU 1701 and the like via the interface 1707, the external bus 1706, the bridge 1705, and the host bus 1704. A communication unit 1716 is connected to a communication line and executes a data communication process with external apparatuses. The data reading unit 1717 is, for example, a scanner, and executes a document reading process. The data output unit 1718 is, for example, a printer, and executes a document data output process.

In addition, the hardware configuration of the information processing apparatus shown in FIG. 17 shows a configuration example, and the exemplary embodiment is not limited to the configuration shown in FIG. 17 and may employ a configuration which may execute the modules described in the exemplary embodiment. For example, some modules may be constituted by dedicated hardware (for example, an application specific integrated circuit (ASIC)), some modules may have a form where they exist in an external system and are connected via a communication line, and plural systems shown in FIG. 17 may be connected to each other via a communication line and be operated in cooperation with each other. In addition, the hardware configuration may be incorporated into a copier, a facsimile, a scanner, a printer, a multi-function peripheral (an image processing apparatus having two or more functions of a scanner, a printer, a copier and a facsimile), or the like.

Although the above exemplary embodiment is described mainly using an example of the case of horizontal writing, a coordinate system rotated by 90 degrees may be used in a case of vertical writing. In this case, left alignment in the horizontal writing becomes upper alignment in the vertical writing, and right alignment in the horizontal writing becomes lower alignment in the vertical writing. In addition, a midpoint of a line is a midpoint in the horizontal width of the line in the horizontal writing and is a midpoint in the height of the line in the vertical writing.

In addition, the layout information acquiring module 110 may determine whether or not a region is in horizontal writing (or vertical writing) on the basis of layout information, and, then, processes according to a determination result thereof (processes for horizontal writing in a case of horizontal writing, and processes for vertical writing in a case of vertical writing) may be performed. In addition, in the determination of the horizontal writing based on the layout information, if there is information indicating whether or not a region is in horizontal writing in the layout information, determination is performed according to the information. In addition, if there is no information, determination may be performed using a ratio of the height and the width of a line in the line information of the layout information. For example, if the ratio indicates that it is horizontally larger than a predefined ratio, horizontal writing may be determined, and if the ratio indicates that it is vertically larger than a predefined ration, vertical writing may be determined.

In the description of the above exemplary embodiment, in comparison with a predefined value, "equal to or more than", "equal to or less than", "more than", and "less than" may be respectively replaced with "more than", "less than", "equal to or more than", and "equal to or less than" as long as a combination thereof does not cause contradiction.

In addition, the above-described program may be stored on a recording medium and be provided, or the program may be provided using a communication unit. In this case, for example, the above-described program may be understood as the invention of a "computer readable recording medium recording the program".

The "computer readable recording medium recording the program" refers to a recording medium which is used to install and execute the program and distribute the program, records the program thereon and is capable of being read by a computer.

In addition, the recording medium includes, for example, "DVD-R, DVD-RW, DVD-RAM, or the like" which is a digital versatile disc (DVD) and is a standard formulated by the DVD forum, "DVD+R, DVD+RW, or the like" which is a standard formulated by DVD+RW, a read only memory (CD-ROM), a CD-recordable (CD-R), a CD-rewritable (CD-RW), or the like as a compact disc (CD), a Blu-ray disc (registered trademark), a magneto-optical disc (MO), a flexible disc (FD), a magnetic tape, a hard disk, a read only memory (ROM), an electrically erasable programmable read-only memory (EEPROM (registered trademark)), a flash memory, a random access memory (RAM), an SD (Secure Digital) memory card, or the like.

The above-described program or a part thereof may be recorded on the recording medium so as to be reserved or distributed. In addition, the program may be transmitted by communication, for example, via wired networks such as a local area network (LAN), a metropolitan area network (MAN), a wide area network (WAN), the Internet, an intranet, and an extranet, or wireless communication networks. Further, the program may be transmitted using transmission media such as a combination of the recording media, or may be carried on a carrier.

Further, the above-described program may be a part of another program, or may be recorded on the recording medium along with a separate program. In addition, the program may be recorded on plural recording media so as to be divided. The program may be recorded in any form as long as it may be recovered through compression, encoding, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an acquisition unit that acquires, via an image processing device, region information which is information regarding a region in a document, line information which is information regarding a line in the region, and character information which is information regarding a character in the line;
a determination unit that determines whether or not a region including a line indicated by line information is in left alignment on the basis of the line information acquired by the acquisition unit wherein, when a target language of the document is a language which is not regulated such that line ends are aligned, the determination unit changes line information on the basis of character information regarding a character in the next line of a line indicated by the line information and then determines whether or not a region including the line indicated by the line information is in left alignment, and wherein the changes of line information refers to changing information indicating a length of a line in the line information;
a first division unit that divides a region, determined as not being in left alignment by the determination unit, that includes a character indicated by character information into paragraph regions or itemized regions on the basis of the character information acquired by the acquisition unit;
an analysis unit that analyzes an indent of a line in a region determined as being in left alignment by the determination unit;
a second division unit that divides the region determined as being in left alignment by the determination unit on the basis of the analysis result by the analysis unit, into paragraph regions or itemized regions; and
an output unit that outputs both: (i) the division result by the first division unit for the region determined as not being in left alignment by the determination unit, and (ii)

the division result by the second division unit for the region determined as being in left alignment by the determination unit.

2. The information processing apparatus according to claim 1, wherein the determination unit calculates coordinates of a midpoint of a line indicated by line information on the basis of the line information acquired by the acquisition unit and determines whether or not the region is in left alignment on the basis of one or more of coordinates of a line head, the coordinates of the midpoint and coordinates of a line end of the line in the region.

3. The information processing apparatus according to claim 2, wherein the first division unit divides the region into paragraph regions or itemized regions on the basis of whether or not a character string of one or more characters existing in a line head or a line end satisfies a predefined character string condition.

4. The information processing apparatus according to claim 1, wherein the first division unit divides the region into paragraph regions or itemized regions on the basis of whether or not a character string of one or more characters existing in a line head or a line end satisfies a predefined character string condition.

5. The information processing apparatus according to claim 1, wherein the first division unit divides the region into paragraph regions or itemized regions on the basis of whether or not a value predefined by the number of characters of a line in the region satisfies a predefined condition.

6. The information processing apparatus according to claim 1, wherein the analysis unit analyzes an indent of a line by classifying each line into a line which is indented and a line which is not indented on the basis of a distance from a left end of a region to a left end of each line in the region.

7. The information processing apparatus according to claim 6, wherein the second division unit divides the region into paragraph regions or itemized regions on the basis of whether or not a predefined character string is included in a character string included in a line and whether or not a boundary of the classification which is an analysis result by the analysis unit overlaps a boundary of the paragraph.

8. A non-transitory computer readable medium storing an information processing program causing a computer to function as:
    an acquisition unit that acquires, via an image processing device, region information which is information regarding a region in a document, line information which is information regarding a line in the region, and character information which is information regarding a character in the line;
    a determination unit that determines whether or not a region including a line indicated by line information is in left alignment on the basis of the line information acquired by the acquisition unit wherein, when a target language of the document is a language which is not regulated such that line ends are aligned, the determination unit changes line information on the basis of character information regarding a character in the next line of a line indicated by the line information and then determines whether or not a region including the line indicated by the line information is in left alignment, and wherein the changes of line information refers to changing information indicating a length of a line in the line information;
    a first division unit that divides a region, determined as not being in left alignment by the determination unit, that includes a character indicated by character information into paragraph regions or itemized regions on the basis of the character information acquired by the acquisition unit;
    an analysis unit that analyzes an indent of a line in a region determined as being in left alignment by the determination unit;
    a second division unit that divides the region determined as being in left alignment by the determination unit on the basis of the analysis result by the analysis unit, into paragraph regions or itemized regions; and
    an output unit that outputs both: (i) the division result by the first division unit for the region determined as not being in left alignment by the determination unit, and (ii) the division result by the second division unit for the region determined as being in left alignment by the determination unit.

9. An information processing apparatus comprising:
    an acquisition unit that acquires, via an image processing device, region information which is information regarding a region in a document, line information which is information regarding a line in the region, and character information which is information regarding a character in the line;
    a determination unit that determines whether or not a region including a line indicated by line information is in left alignment on the basis of the line information acquired by the acquisition unit wherein, when a target language of the document is a language which is not regulated such that line ends are aligned, the determination unit changes line information on the basis of character information regarding a character in the next line of a line indicated by the line information and then determines whether or not a region including the line indicated by the line information is in left alignment, and wherein the changes of line information refers to changing information indicating a length of a line in the line information;
    a first division unit that divides a region, determined as not being in left alignment by the determination unit, that includes a character indicated by character information into paragraph regions or itemized regions on the basis of the character information acquired by the acquisition unit;
    an analysis unit that analyzes an indent of a line in a region determined as being in left alignment by the determination unit;
    a second division unit that divides the region determined as being in left alignment by the determination unit on the basis of the analysis result by the analysis unit, into paragraph regions or itemized regions; and
    an output unit that outputs both: (i) the division result by the first division unit for the region determined as not being in left alignment by the determination unit, and (ii) the division result by the second division unit for the region determined as being in left alignment by the determination unit.

10. The information processing apparatus according to claim 9, wherein the determination unit calculates coordinates of a midpoint of a line indicated by line information on the basis of the line information acquired by the acquisition unit and determines whether or not the region is in upper alignment on the basis of one or more of coordinates of a line head, the coordinates of the midpoint and coordinates of a line end of the line in the region.

11. The information processing apparatus according to claim 9, wherein the first division unit divides the region into paragraph regions or itemized regions on the basis of whether or not a character string of one or more characters existing in a line head or a line end satisfies a predefined character string condition.

12. The information processing apparatus according to claim 9, wherein the first division unit divides the region into paragraph regions or itemized regions on the basis of whether or not a value predefined by the number of characters of a line in the region satisfies a predefined condition.

13. The information processing apparatus according to claim 9, wherein the analysis unit analyzes an indent of a line by classifying each line into a line which is indented and a line which is not indented on the basis of a distance from an upper end of a region to an upper end of each line in the region.

14. The information processing apparatus according to claim 13, wherein the second division unit divides the region into paragraph regions or itemized regions on the basis of whether or not a predefined character string is included in a character string included in a line and whether or not a boundary of the classification which is an analysis result by the analysis unit overlaps a boundary of the paragraph.

15. A non-transitory computer readable medium storing an information processing program causing a computer to function as:
- an acquisition unit that acquires, via an image processing device, region information which is information regarding a region in a document, line information which is information regarding a line in the region, and character information which is information regarding a character in the line;
- a determination unit that determines whether or not a region including a line indicated by line information is in left alignment on the basis of the line information acquired by the acquisition unit wherein, when a target language of the document is a language which is not regulated such that line ends are aligned, the determination unit changes line information on the basis of character information regarding a character in the next line of a line indicated by the line information and then determines whether or not a region including the line indicated by the line information is in left alignment, and wherein the changes of line information refers to changing information indicating a length of a line in the line information;
- a first division unit that divides a region, determined as not being in left alignment by the determination unit, that includes a character indicated by character information into paragraph regions or itemized regions on the basis of the character information acquired by the acquisition unit;
- an analysis unit that analyzes an indent of a line in a region determined as being in left alignment by the determination unit;
- a second division unit that divides the region determined as being in left alignment by the determination unit on the basis of the analysis result by the analysis unit, into paragraph regions or itemized regions; and
- an output unit that outputs both: (i) the division result by the first division unit for the region determined as not being in left alignment by the determination unit, and (ii) the division result by the second division unit for the region determined as being in left alignment by the determination unit.

* * * * *